INVENTORS.
HARRY T. JOHNSON
VELJKO MILENKOVIC
JOHN WALTER
BY
Murray Schaffer
ATTORNEY

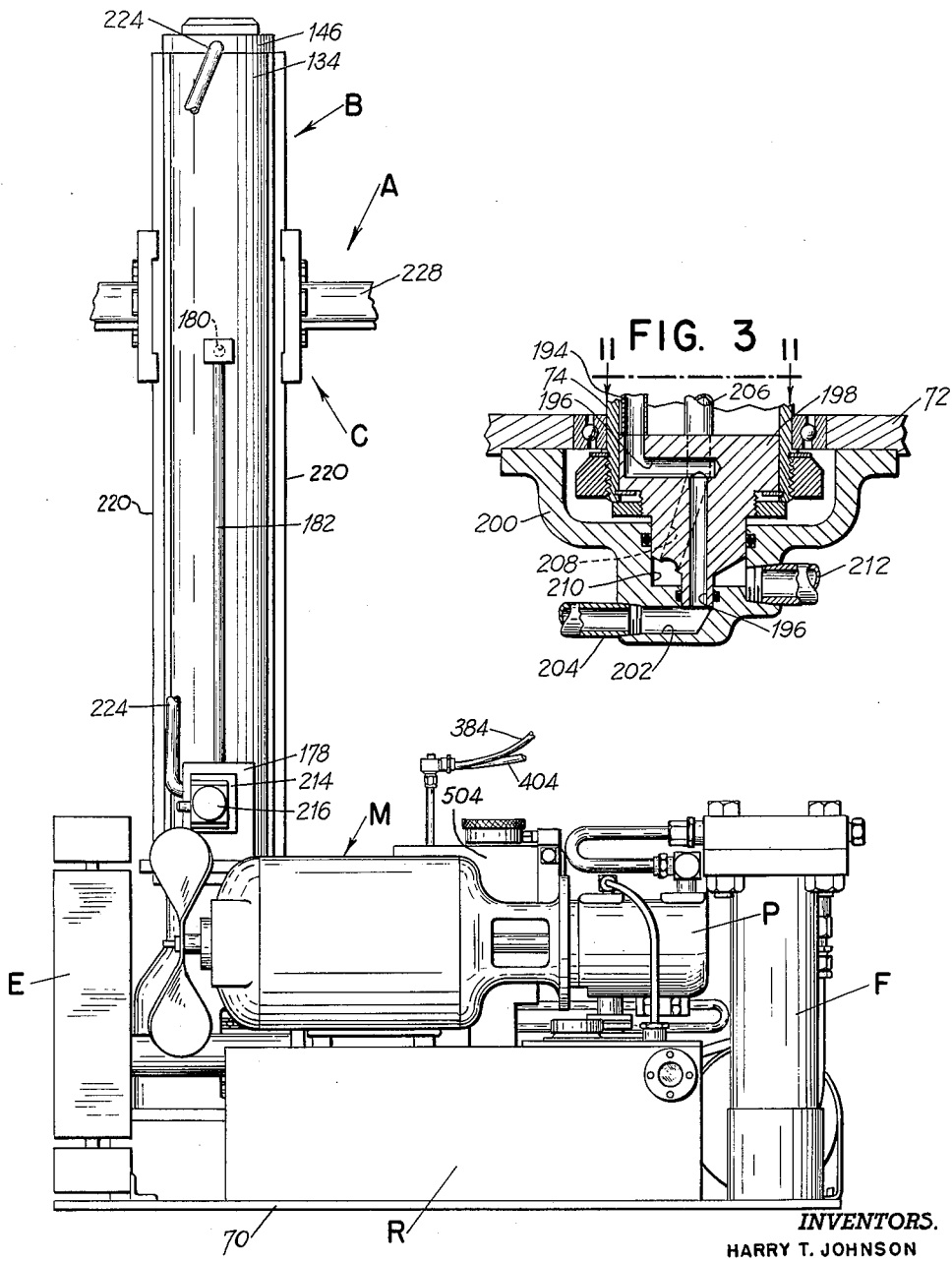

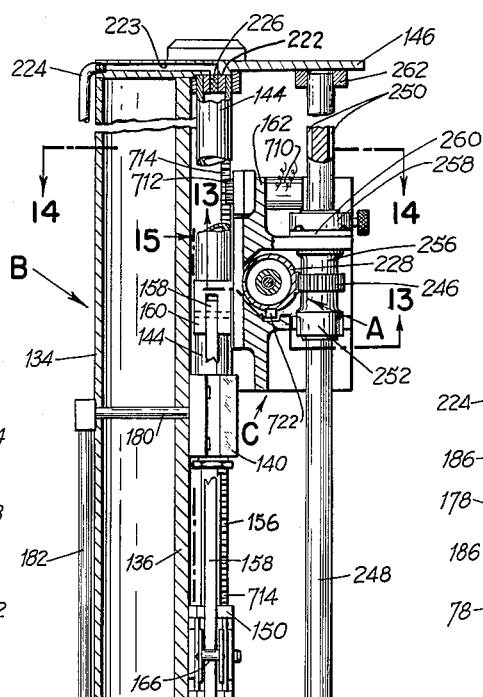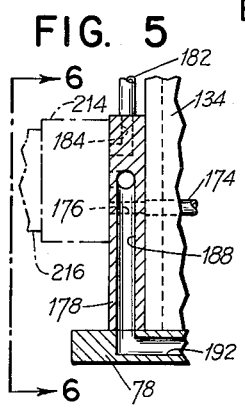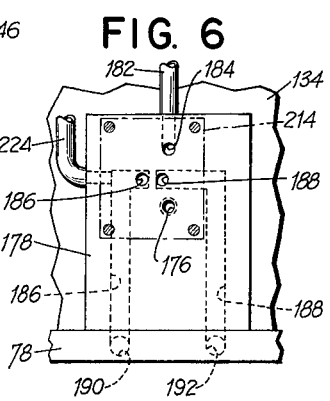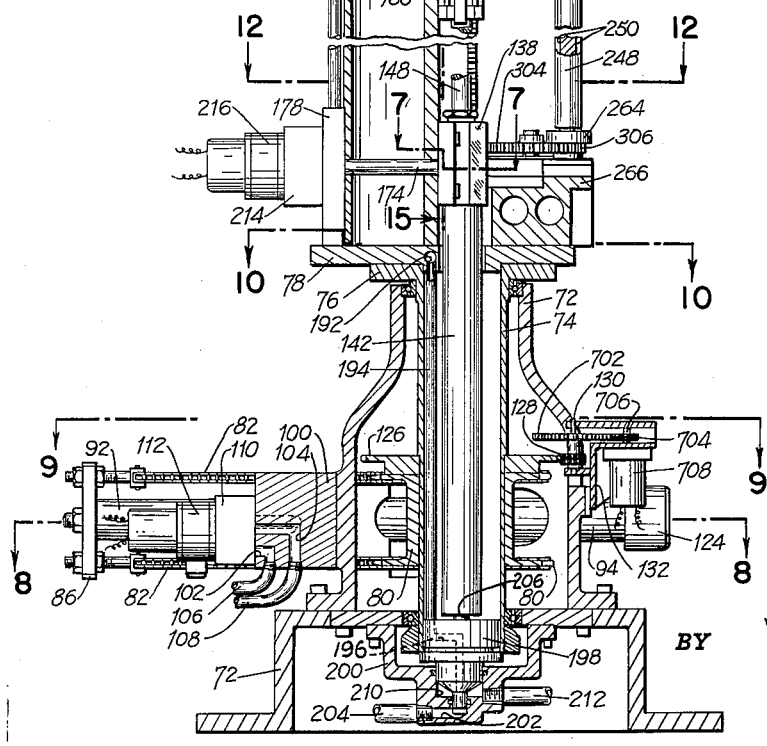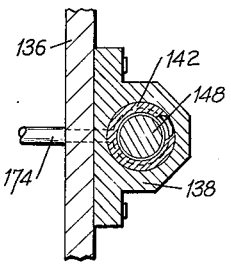

Oct. 19, 1965 H. T. JOHNSON ETAL 3,212,649
MACHINE FOR PERFORMING WORK
Filed July 15, 1960 17 Sheets-Sheet 4

INVENTORS.
HARRY T. JOHNSON
VELJKO MILENKOVIC
JOHN WALTER
BY
Murray Schaff
ATTORNEY INVENTORS.
HARRY T. JOHNSON
VELJKO MILENKOVIC
JOHN WALTER
BY Murray Schaffer
ATTORNEY

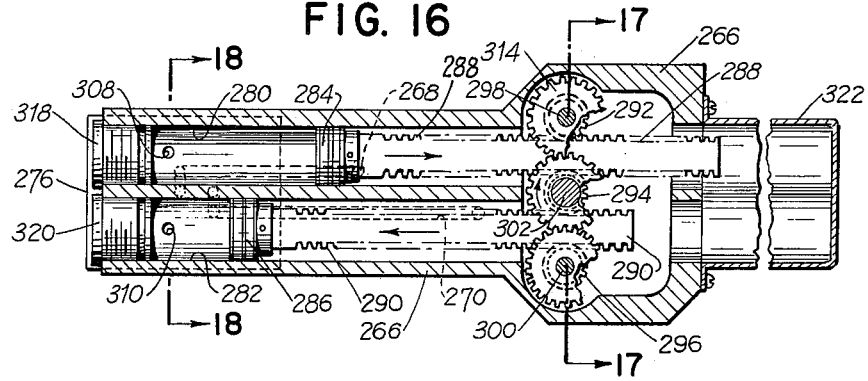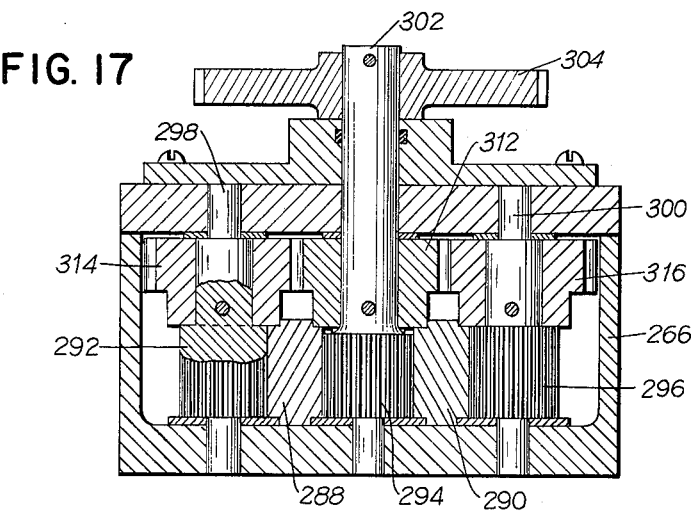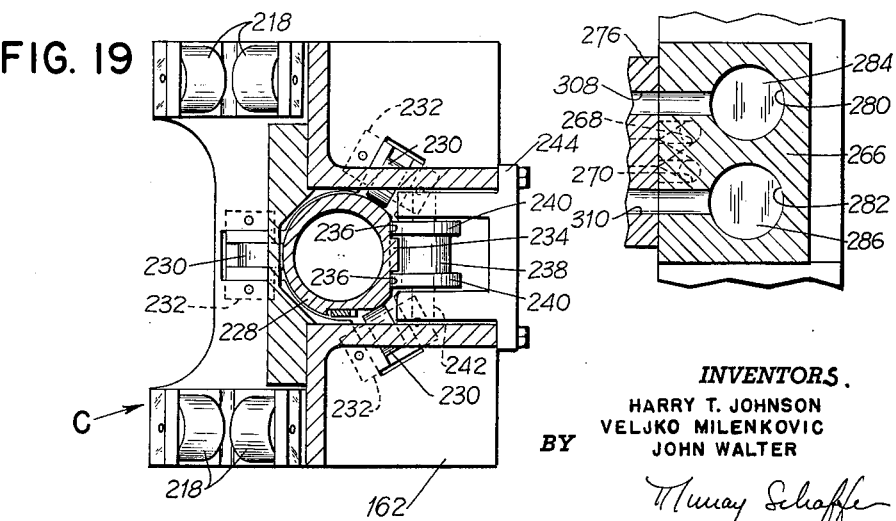

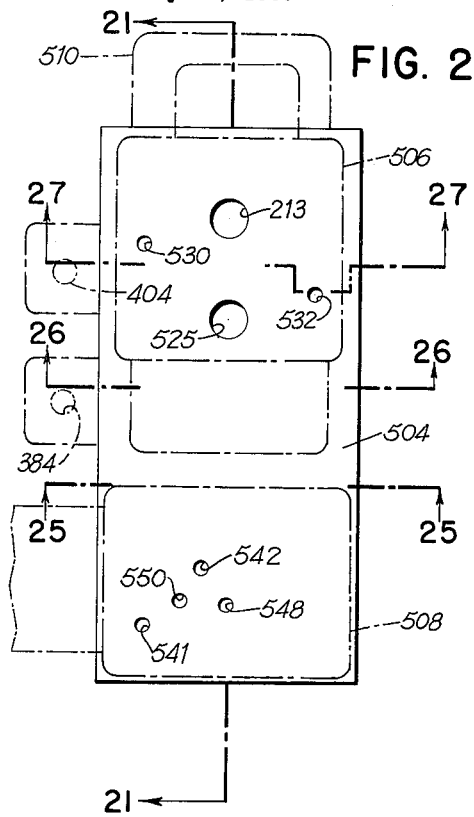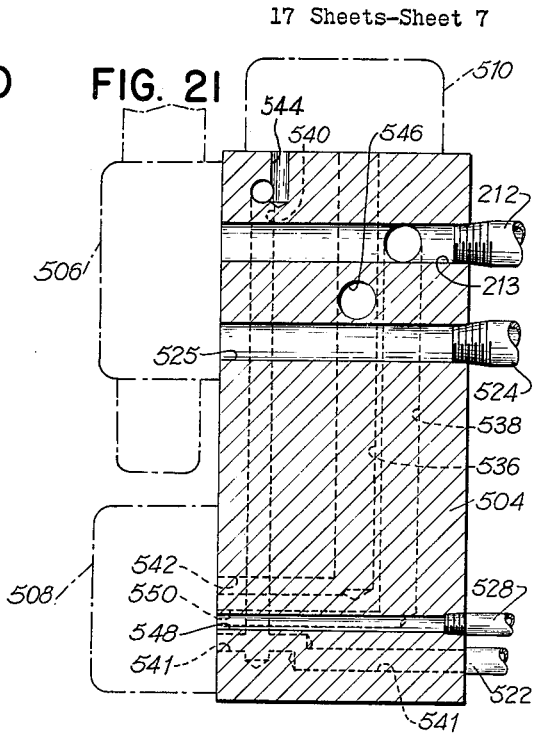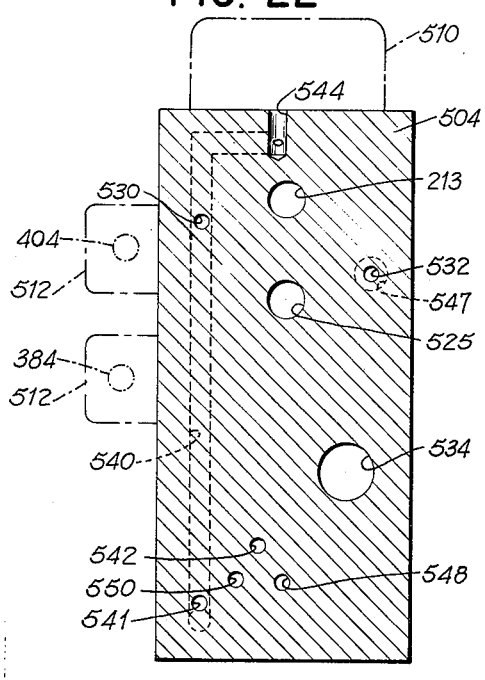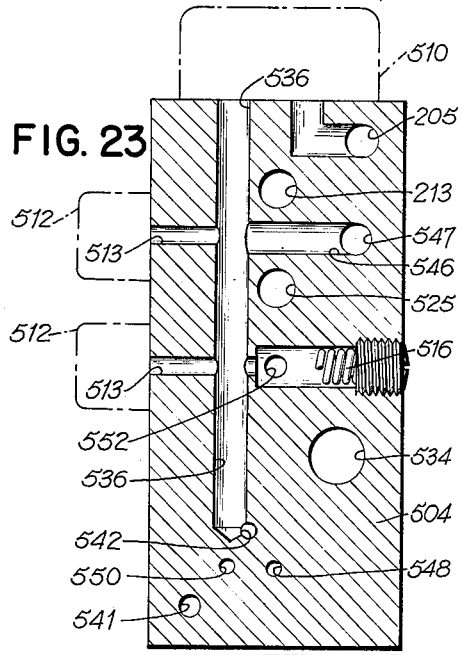

Oct. 19, 1965    H. T. JOHNSON ETAL    3,212,649
MACHINE FOR PERFORMING WORK
Filed July 15, 1960    17 Sheets-Sheet 8

INVENTORS.
HARRY T. JOHNSON
VELJKO MILENKOVIC
JOHN WALTER
BY
Murray Schafer
ATTORNEY Oct. 19, 1965   H. T. JOHNSON ETAL   3,212,649
MACHINE FOR PERFORMING WORK
Filed July 15, 1960   17 Sheets-Sheet 9
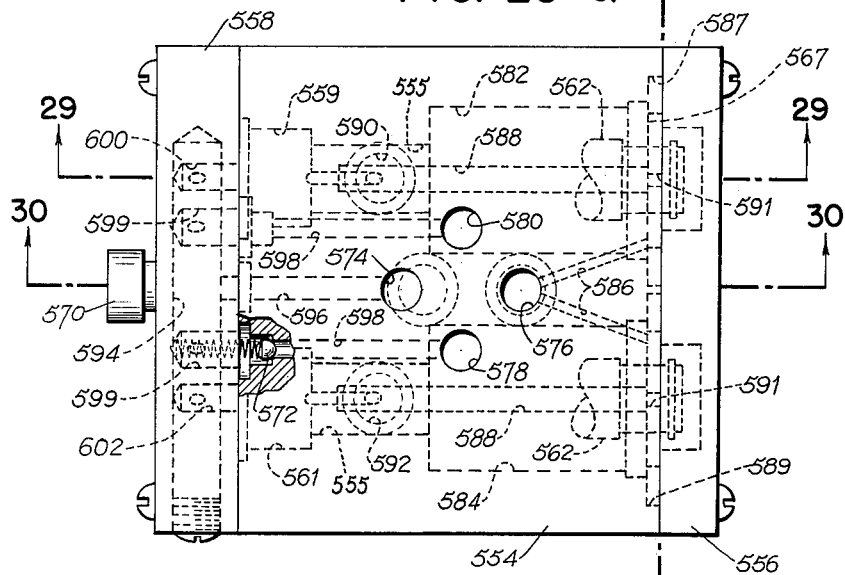
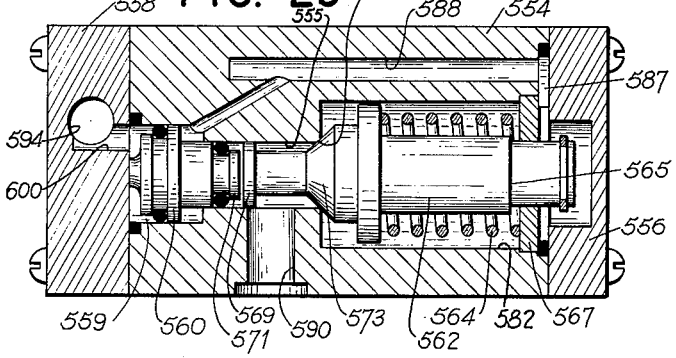
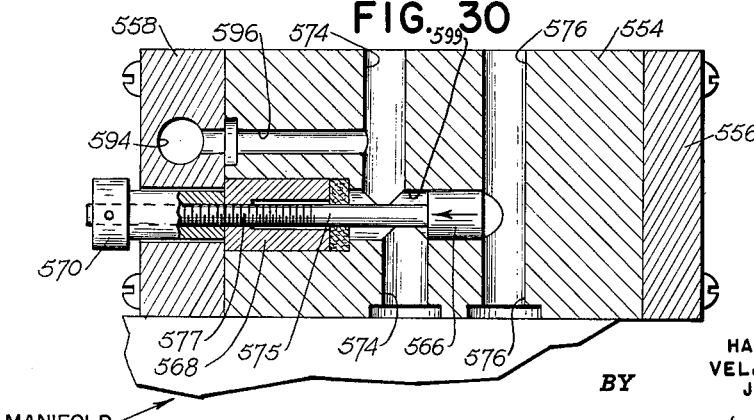
INVENTORS
HARRY T. JOHNSON
VELJKO MILENKOVIC
JOHN WALTER
BY Murray Schaffer
ATTORNEY

INVENTORS.
HARRY T. JOHNSON
VELJKO MILENKOVIC
BY JOHN WALTER

*Murray Schaffer*
ATTORNEY

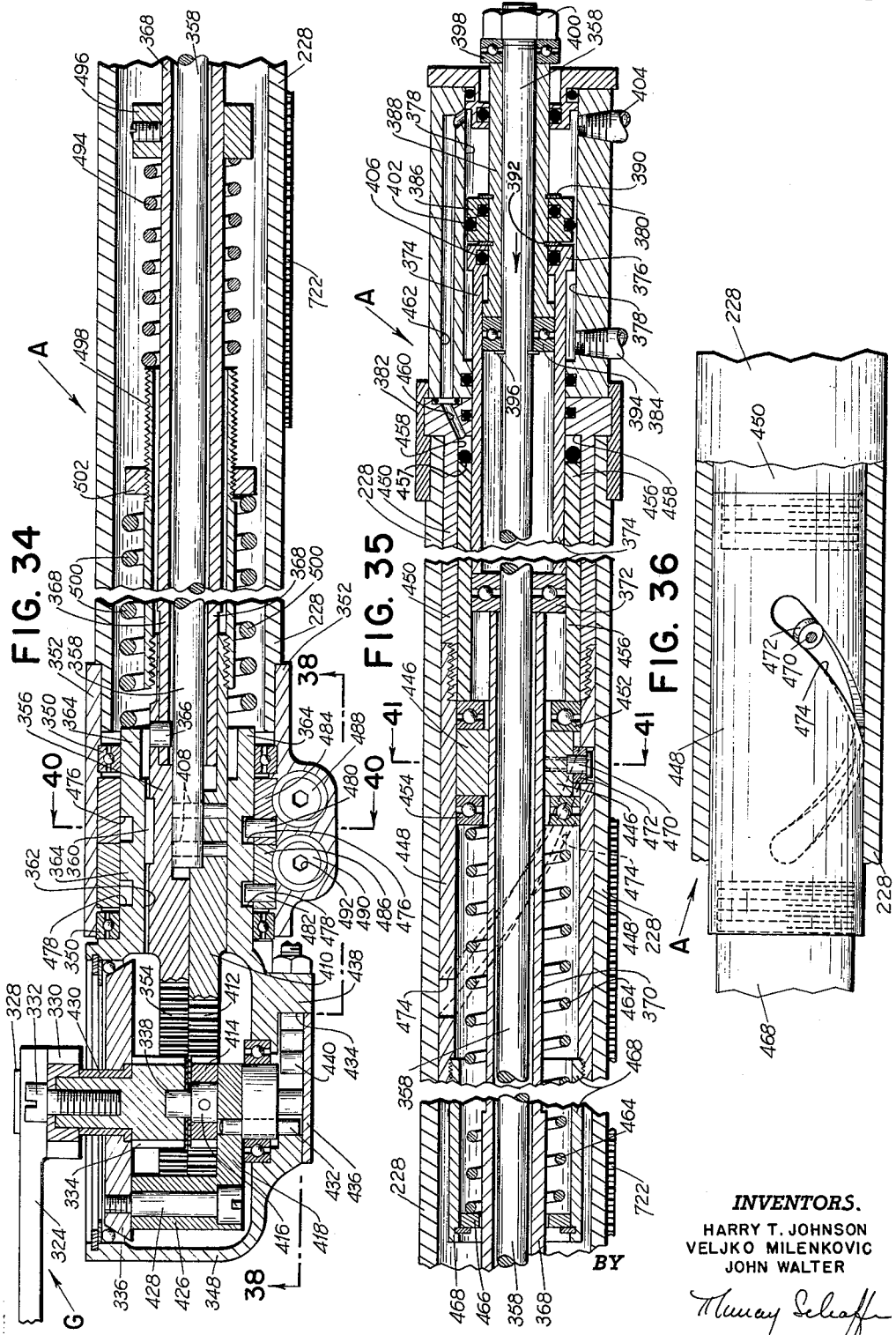

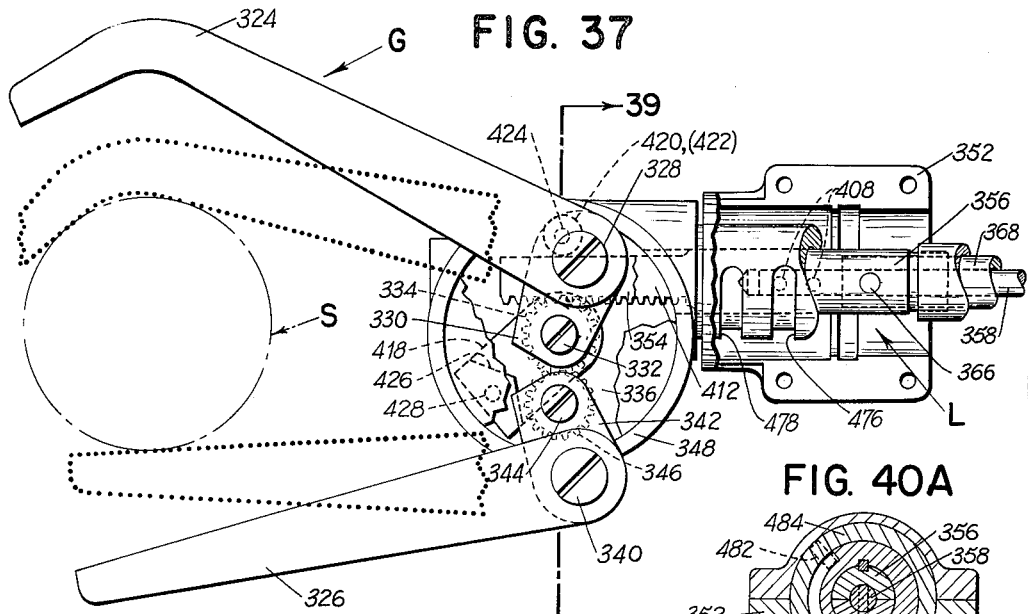
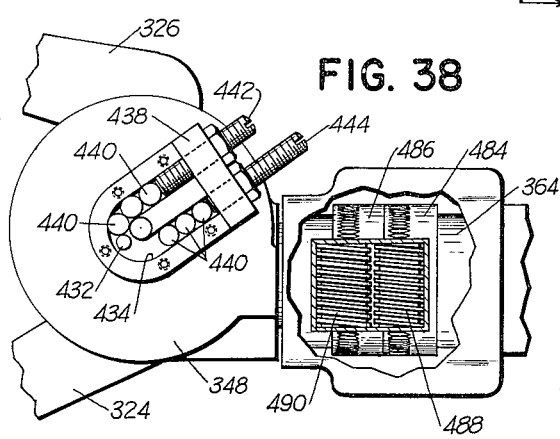
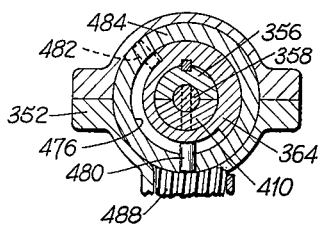
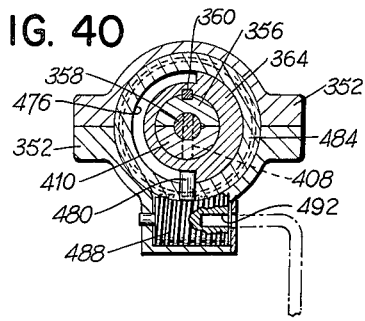
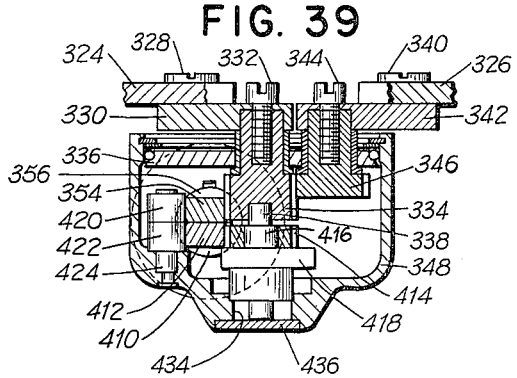
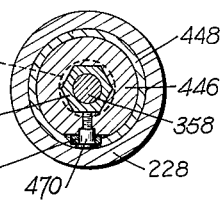

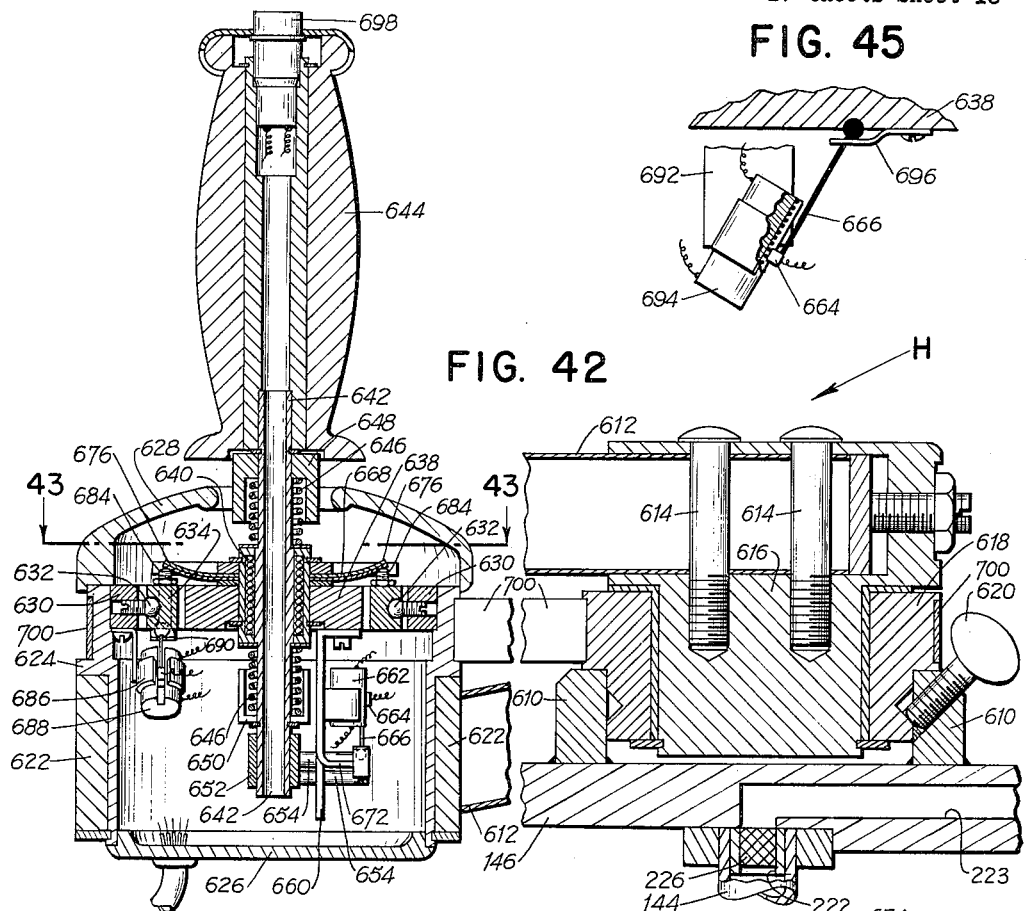
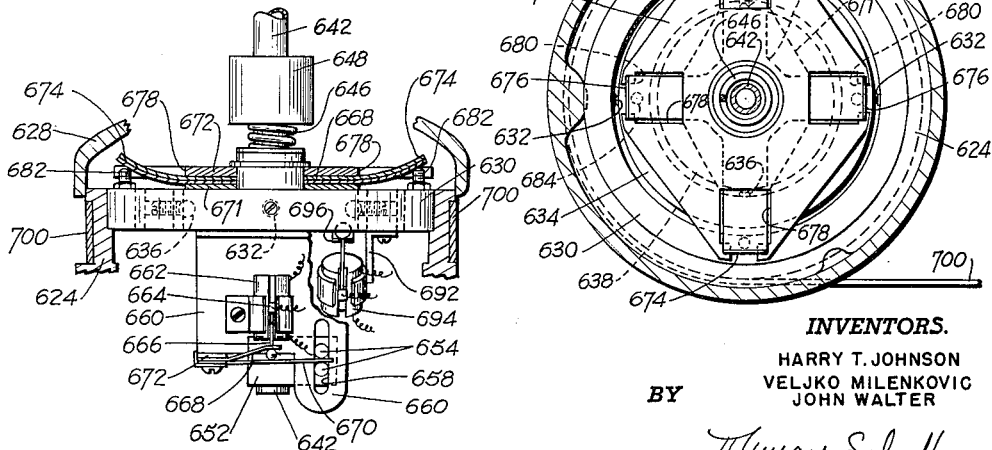

Oct. 19, 1965　　　H. T. JOHNSON ETAL　　　3,212,649
MACHINE FOR PERFORMING WORK

Filed July 15, 1960　　　　　　　　　　　　　　　　17 Sheets-Sheet 14

FIG. 46

INVENTORS.
HARRY T. JOHNSON
VELJKO MILENKOVIC
JOHN WALTER
BY
*Murray Schaff*
ATTORNEY Oct. 19, 1965    H. T. JOHNSON ETAL    3,212,649
MACHINE FOR PERFORMING WORK
Filed July 15, 1960    17 Sheets-Sheet 17

INVENTORS.
HARRY T. JOHNSON
VELJKO MILENKOVIC
JOHN WALKER
BY
Murray Schaffer
ATTORNEY

# United States Patent Office 3,212,649
Patented Oct. 19, 1965

3,212,649
MACHINE FOR PERFORMING WORK
Harry T. Johnson, Glenview, Veljko Milenkovic, Chicago, and John Walter, Evergreen Park, Ill., assignors to American Machine & Foundry Company, a corporation of New Jersey
Filed July 15, 1960, Ser. No. 43,090
14 Claims. (Cl. 214—1)

The present invention relates to a machine for performing a plurality of repetitive operations or manipulations with or on objects in accordance with a prescribed patterned sequence.

The demands of industry are such that there is an ever increasing need for machines capable of simulating operations and functions of all kinds of workers in handling manipulating, assembling and transferring work, work pieces, machines and objects being fabricated at the work bench, or from one machine to another or in one machine only as the case may be in accordance with prescribed sequences of operations.

Attempts have been made heretofore to solve this problem and machines and attachments have been designed for this purpose. For example, devices have been built to control the automatic operation of machine tools, such as presses and lathes. Also, attempts have been made to operate machines which functioned within prescribed coordinates of motion in response to carefully calculated or computed straight-line paths of movement. Further, such machines required tooling for one job only and were not readily applicable for others.

The present invention constitutes a solution of the above problem because it provides a machine which has such flexibility and versatility that when properly programmed, it is capable of carrying out not only simple, but also complex movements and operations closely simulating acts and functions heretofore considered to be possible only by actual workers. A machine constructed in accordance with the invention has at least three basic degrees of freedom which allow vertical, horizontal and rotary motion as well as three dimensional diagonal movements. And in the illustrated embodiment at least three supplemental degrees of freedom are provided. Thus it is obvious that when a selected programmed sequence is prepared the machine can perform repetitively such operations as assembling machine parts, transferring work pieces from one station to another, close or open a circuit, and other tasks too numerous to mention, for as long or short a period as desired.

Features which contribute to the versatility and flexibility of the machine include: The ease with which it can be programmed. The ease with which it can be moved from one operating station to another in order to perform the many and varied tasks to which it may be assigned. The compactness of its structure which is made possible by the design of its actuating members such that a maximum multiplication of movement is made possible yet the actuators themselves are quite small.

The ease with which the machine can be programmed reflects its versatility because this means that instead of standing idle after completing one job, say of short duration, it can be given another program, and set into operation again with a minimum of effort and thereby contribute to the overall efficiency and productive effort of the plant where it is installed.

Versatility of our novel machine also results from the flexibility of the design, especially in the actuated element or arm which supports the work tool or piece. This latter may take the form of a pair of grippers which in accordance with a preferred embodiment of the invention has three degrees of movement, including a wrist action, closely simulating the wrist action of a human being.

Programming the machine is effected with great simplicity manually by providing the machine with means for manually operating the prime actuators of the machine through prescribed paths of travel without substantial regard to high accuracy except at points where this is required, or generally at the end points of an operative cycle where pieces or objects being handled, manipulated or worked on are taken from or delivered to a work station. Because of the novel construction of our machine and the relative simplicity of our programming mechanism, programming is accomplished with relative rapidity and without any need for elaborate computation or calculation in order to effect this purpose. Furthermore, as a result of our novel system of programming the time scale of the machine can be increased or decreased in accordance with the desired rate of playback operation of the machine required.

It is an object of the invention to provide a novel machine capable of performing repetitively and continuously for any desired period of time operations and functions heretofore capable of performance only by human beings.

The invention is also characterized by a machine which is capable of performing tasks and operations normally performed by workers in which movements are not limited to straight lines, as in a lathe, but rather wherein movement of a tool or work piece carrying element can be along widely varied paths and at arbitrary speed rates through several degrees of freedom. In accordance with the preferred form of the invention disclosed herein, six degrees of freedom are provided.

The invention is further characterized by the provision of a novel machine capable of performing repetitively and continuously in accordance with a programmed sequence, a plurality of tasks, and especially tasks which may be considered montonous, as in the case of placing a nut on a bolt and turning it home, thereby relieving human workers for more important and satisfying tasks.

It is a further object of the invention to provide a novel machine capable of being rapidly and accurately programmed for carrying out many tasks and functions and wherein because of its flexibility in use and programming it can perform satisfactorily and efficiently for long and short periods of time in carrying out a specific programmed sequence.

It is a further object of the invention to provide a novel work handling, transferring and manipulating machine which can be operated alone, or which can readily be placed in a production line and become a coordinated unit of production for as long a period of time as required, and wherein because of the relative simplicity in programming the machine and the flexibility of its design, it can be employed for short or long periods in performing a selected programmed task.

The invention also consists in the provision of a novel work transferring, manipulating and assembling machine having a horizontally movable work piece handling or tool supporting arm, a carriage supporting the arm, and a rotatable vertical column on which the carriage is mounted for vertical movement and wherein the actuating mechanism for the arm, carriage and column are compact in structure so that the maximum movement of the arm carriage and column can be effected without requiring bulking of the machine.

The invention further consists of a novel machine capable of performing a large number of operations and functions such as transferring articles from one station to another, assembling machine parts, and handling work fabricating tools, and wherein the machine is compactly constructed so as to occupy a limited space.

Another object is to provide means to arrest all movements of the machine to prevent damage to the machine as well as to the article handled in case the moving parts of the machine encounter any external obstruction.

Still another object is to provide means for preventing the machine to start before the hydraulic pressure has reached a predetermined value.

Another object is to provide means for maintaining the hydraulic pressure during operation within a predetermined limit and arrest operation when dropping below a given point.

Another object is to provide means for equalizing the pressure in the system in case the hydraulic pressure in one of the actuating cylinders due to malfunction or outside obstruction should rise above a given point, thus preventing damage to delicate parts of the hydraulic control system.

Another object is to provide means for conveniently clearing the hydraulic fluid in the system of impurities before starting.

Another object is to provide means for draining each individual hydraulic activator separately without effect on the others.

With these and other objects not mentioned specifically in view, the invention consists in certain combinations and constructions which will be hereinafter described fully and then specifically set forth in the claims hereunto appended.

In the accompanying drawings which form a part of this specification, and in which like characters of reference indicate the same or like parts:

FIG. 2 is a rear view of the same,

Figure 8:
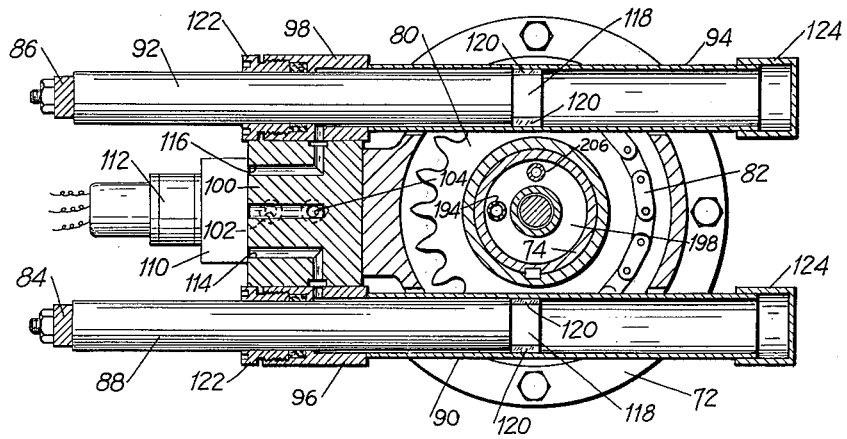
Figure 9:
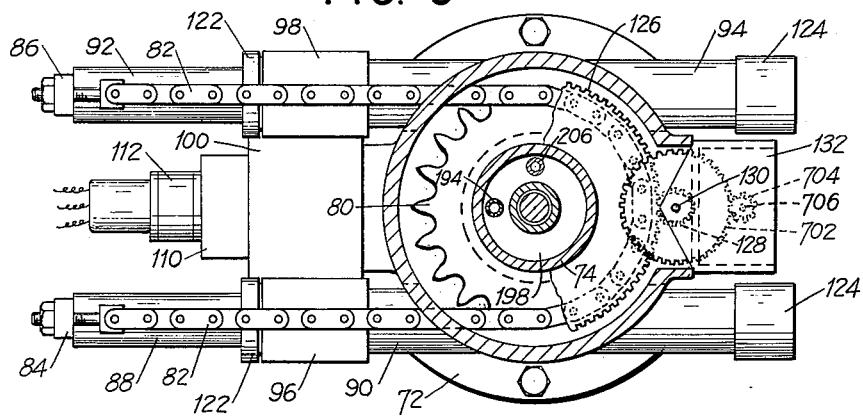
Figure 10:
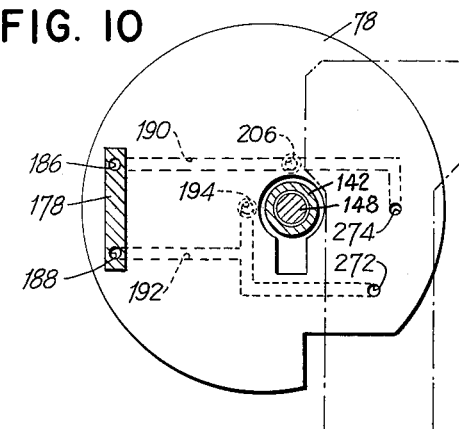
Figure 11:
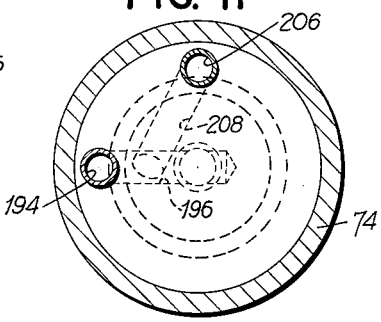
Figure 12:
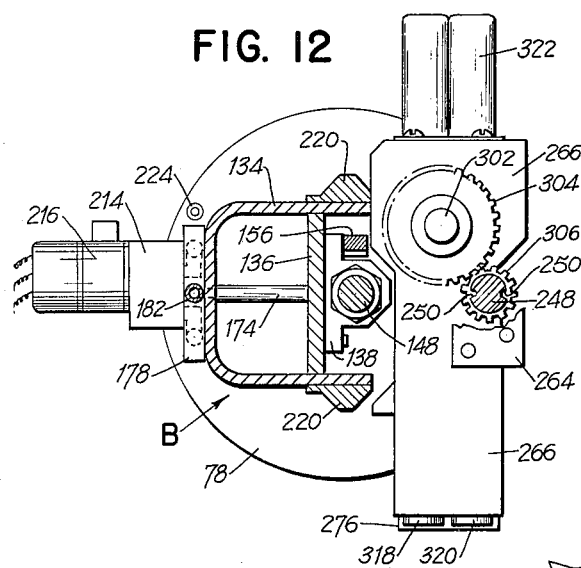
Figure 14:
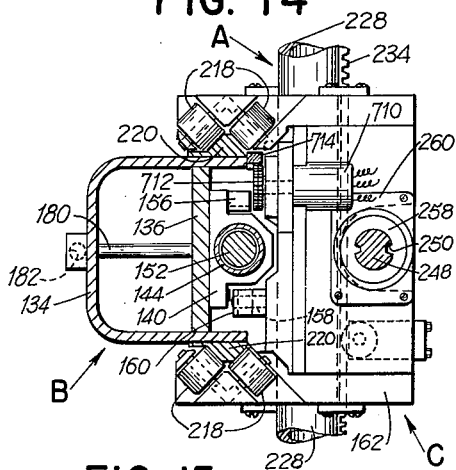
Figure 13:
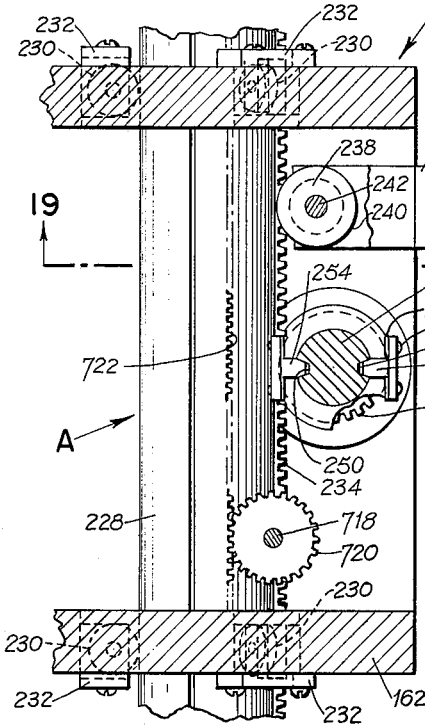
Figure 15:
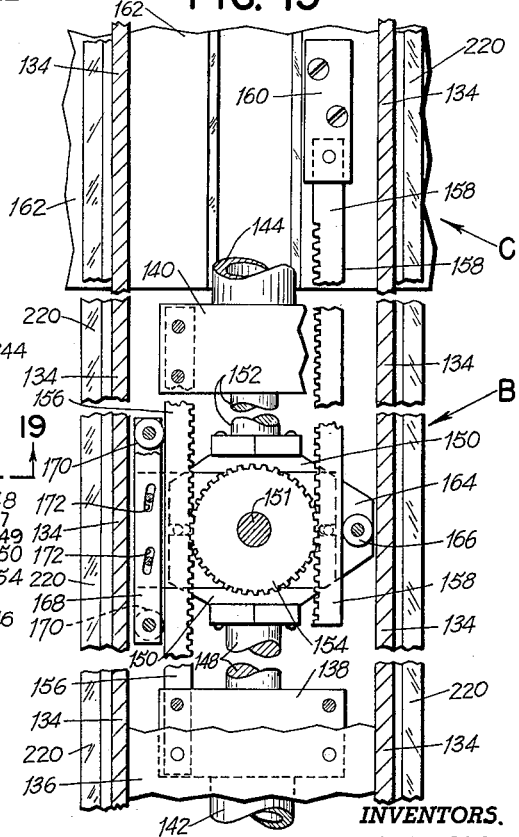
Figure 24:
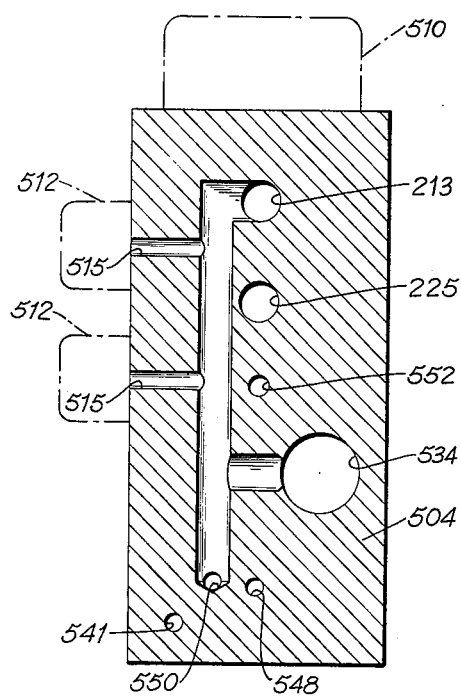
Figure 25:
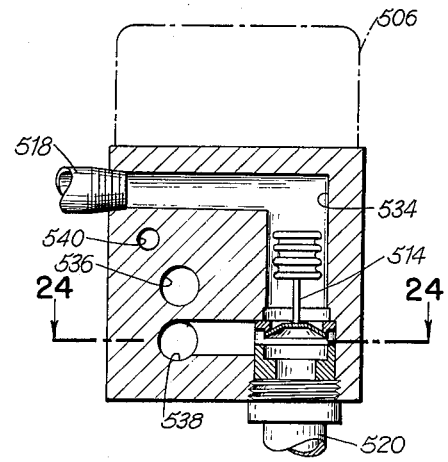
Figure 26:
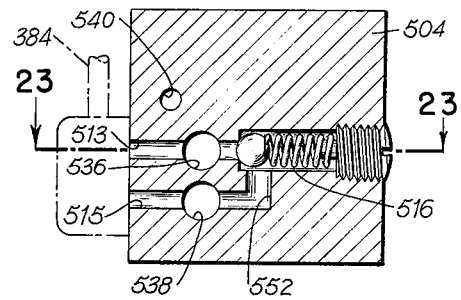
Figure 27:
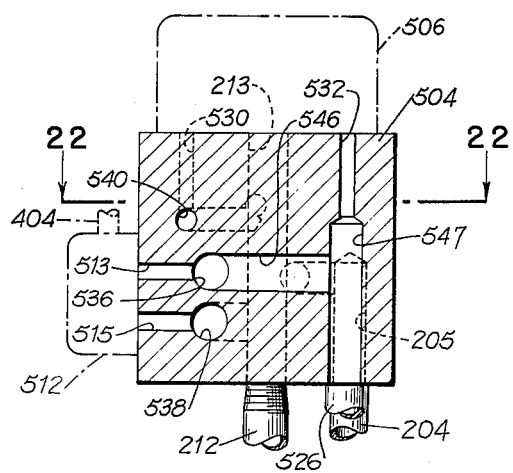
Figure 31:
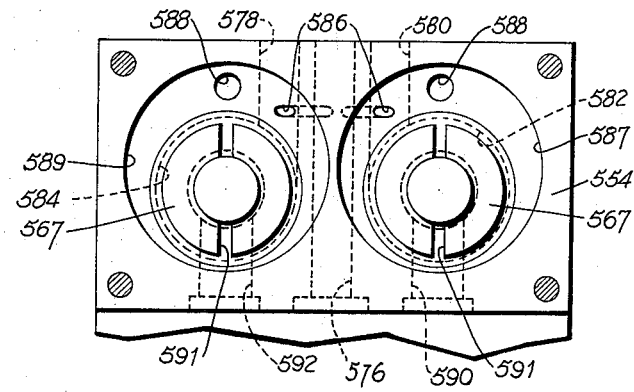
Figure 32:
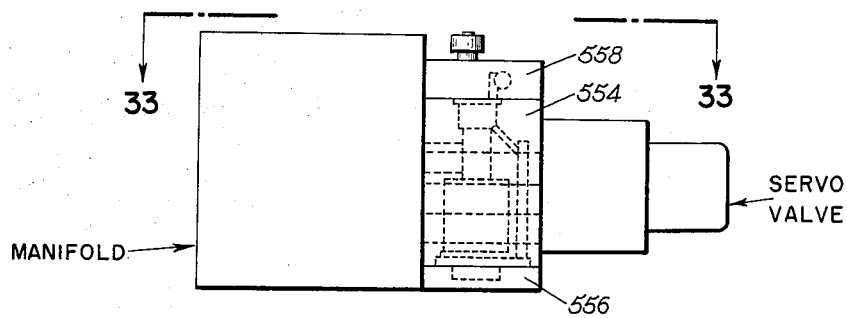
Figure 33:
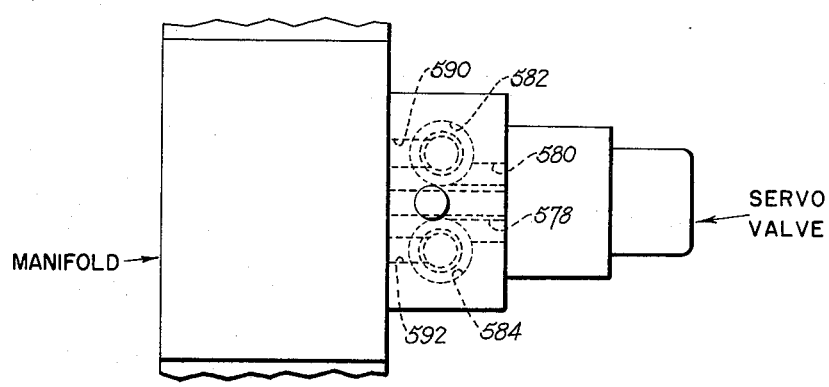
Figure 47:
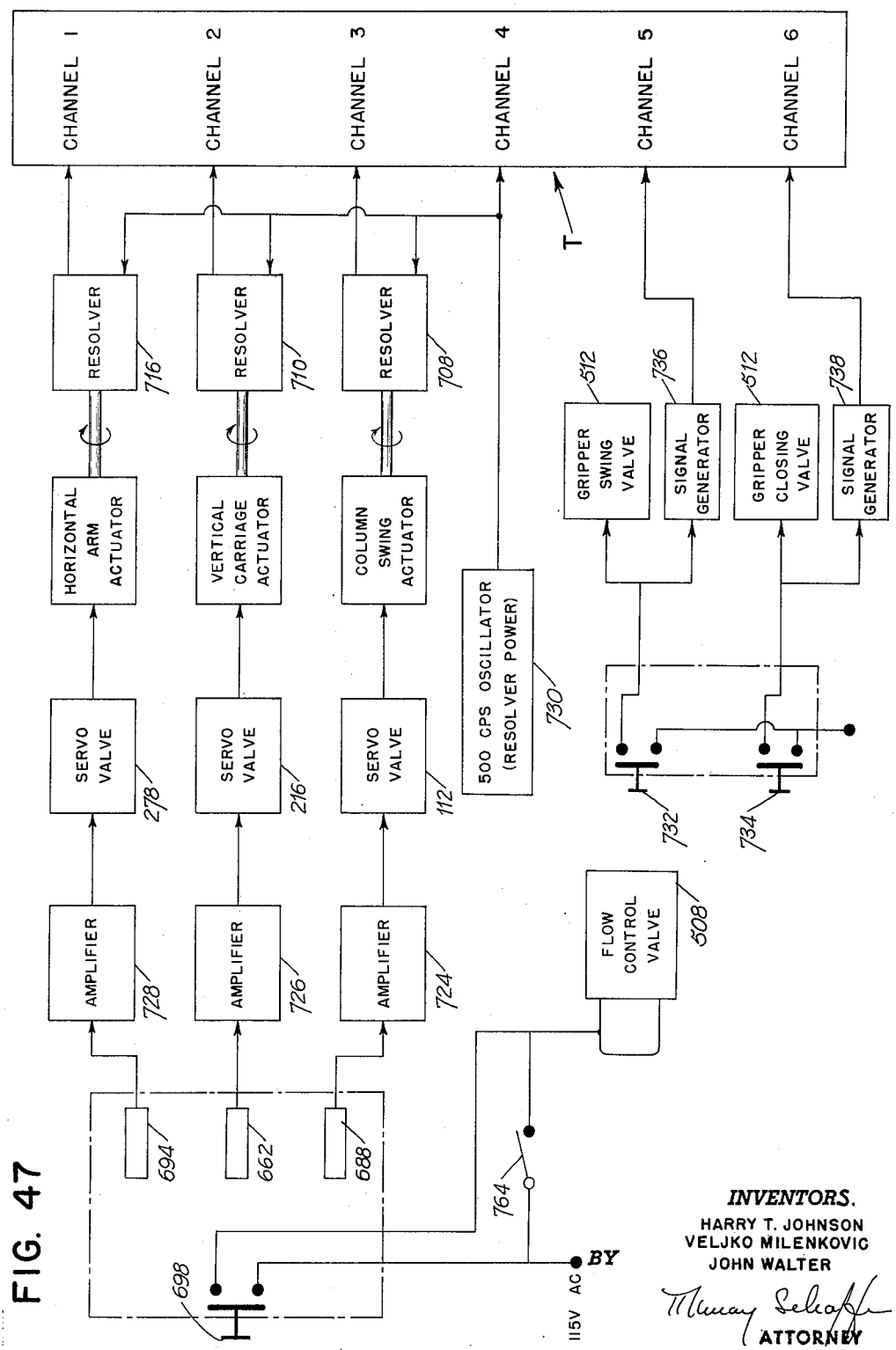
Figure 48:
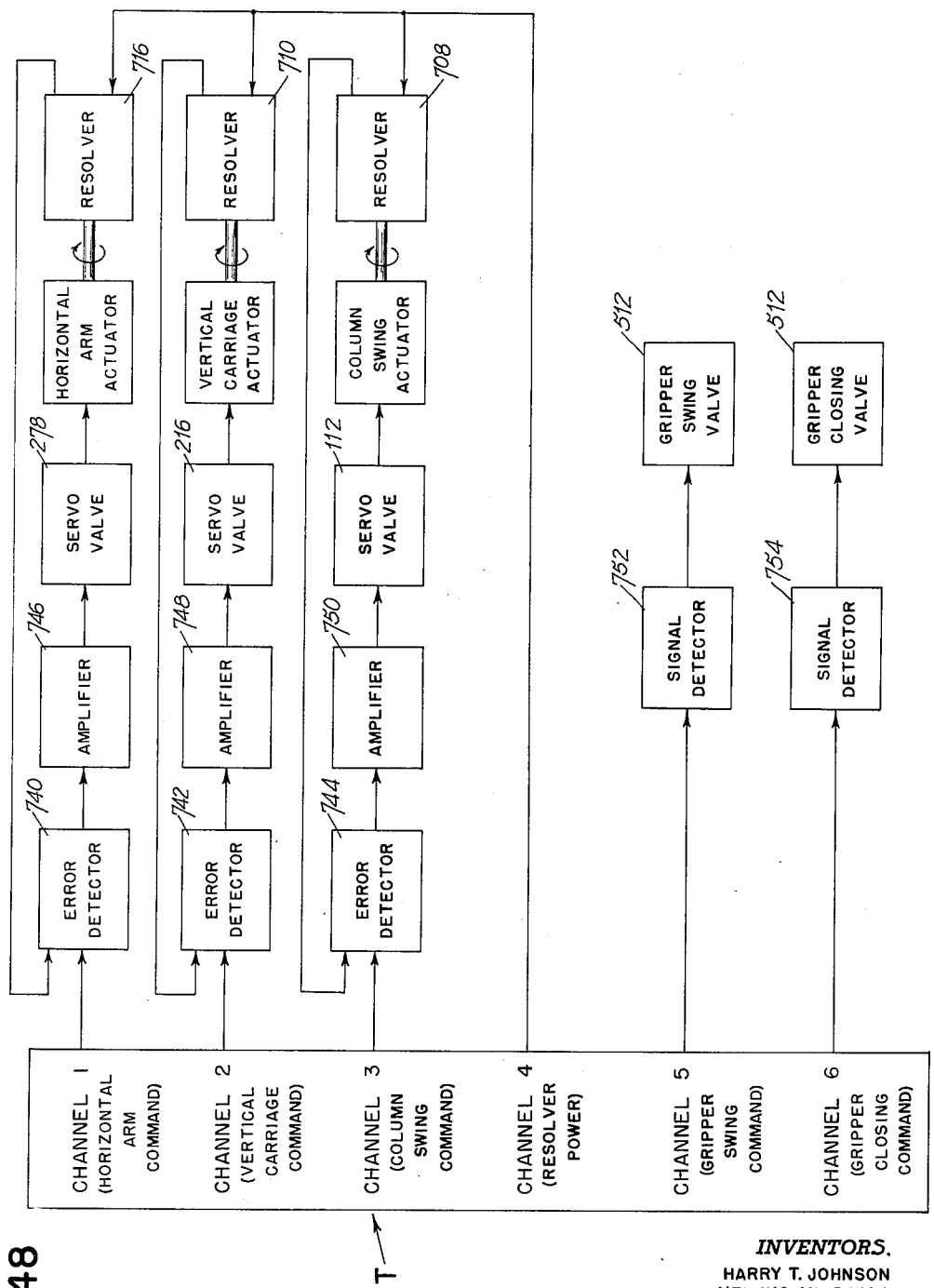
Figure 49:
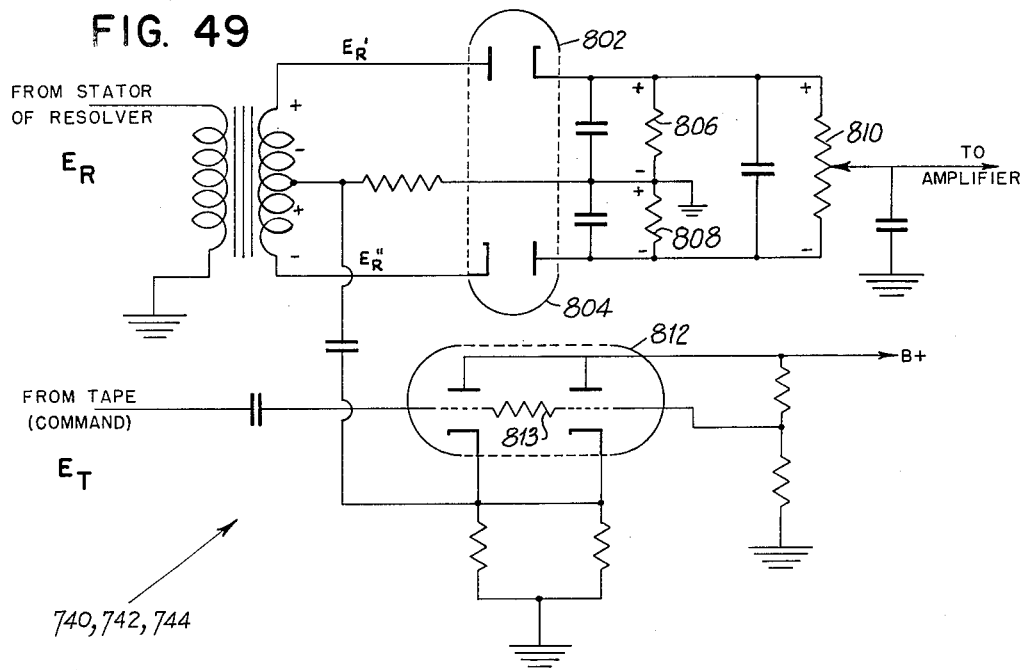
Figure 50:
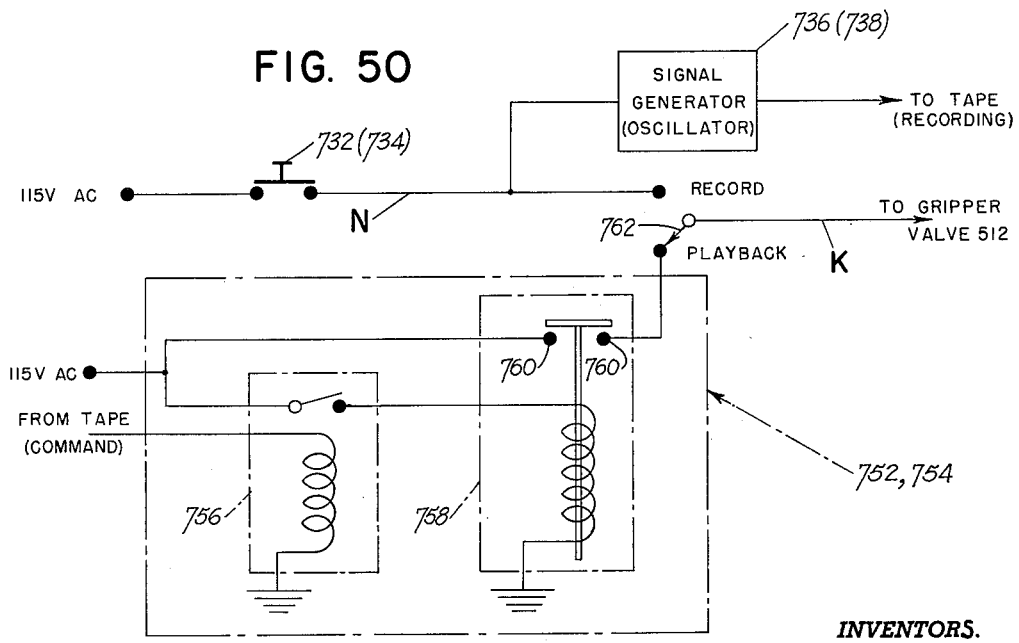

FIG. 3 is a detailed sectional side elevation of the swivelled bottom portion of the vertical column of the machine, FIG. 4 is a sectional side elevation of the machine, FIG. 5 is an enlarged sectional side elevation of the manifold block for the vertical column cylinders, FIG. 6 is a front elevation of the same, taken on line 6—6 of FIG. 5, FIG. 7 is a detailed sectional plan view of the lower vertical cylinder and its supporting block, taken on line 7—7 of FIG. 4, FIG. 8 is a sectional plan view of the manifold connecting the pair of horizontal cylinders employed for activating the vertical column, taken on line 8—8 of FIG. 4, FIG. 9 is also a sectional plan view, taken on line 9—9 of FIG. 4, illustrating the actuating means to impart oscillating motion to the vertical column, FIG. 10 is a sectional plan view, taken on line 10—10 of FIG. 4, illustrating the vertical column mounting plate and manifold, FIG. 11 is a detailed sectional plan view of the swivelled bottom portion of the vertical column, taken on line 11—11 of FIG. 3, FIG. 12 is a sectional plan view illustrating the driving unit for the horizontal arm, taken on line 12—12 of FIG. 4, FIG. 13 is a partial sectional bottom view of the horizontal arm and the driving and guiding means for the same as seen from line 13—13 of FIG. 4, FIG. 14 is a sectional plan of the vertically reciprocating carriage supporting the horizontally reciprocating arm, taken on line 14—14 of FIG. 4, FIG. 15 is a partial sectional rear elevation of the vertical lifting and lowering means for the horizontal arm supporting carriage, taken on line 15—15 of FIG. 4, FIG. 16 is a sectional plan view of the driving unit which imparts reciprocal motion to the horizontal arm, FIG. 17 is a sectional end elevation of the same, taken on the line 17—17 of FIG. 16, FIG. 18 is another sectional end elevation of the horizontal arm driving unit, taken on line 18—18 of FIG. 16, FIG. 19 is a sectional end elevation of the horizontal arm, taken on line 19—19 of FIG. 13, illustrating the guiding means for the same, FIG. 20 is a plan view of the manifold block for the hydraulic control system of the machine, FIG. 21 is a sectional side elevation of the same, taken on line 21—21 of FIG. 20, FIG. 22 is a sectional plan view of the manifold block taken on line 22—22 of FIG. 27, FIG. 23 is also a sectional plan view of the manifold block taken on line 23—23 of FIG. 26, FIG. 24 is another sectional plan view of the manifold block taken on line 24—24 of FIG. 25, FIG. 25 is a sectional end elevation of the manifold block taken on line 25—25 of FIG. 20, FIG. 26 is also a sectional end elevation of the manifold block taken on line 26—26 of FIG. 20, FIG. 27 is another sectional end elevation of the manifold block taken on line 27—27 of FIG. 20, FIG. 28 is a plan view of one of the safety valves, FIG. 29 is a sectional side elevation of the same, taken on line 29—29 of FIG. 28, FIG. 30 is another sectional side elevation of the safety valve, taken on line 30—30 of FIG. 28, FIG. 31 is an end elevation of the safety valve illustrated with the coverplate removed, taken on line 31—31 of FIG. 28, FIG. 32 is a side elevation of the safety valve illustrated in conjunction with a manifold block and a servo control valve, FIG. 33 is an end elevation of the same, taken on line 33—33 of FIG. 32, FIG. 34 is a sectional side elevation of the front portion of the horizontal arm which carries the gripper mechanism, FIG. 35 is a sectional side elevation of the rear portion of the horizontal arm, FIG. 36 is a partial sectional side elevation of the horizontal arm illustrating the wrist motion cam control, FIG. 37 is a plan view of the gripper fingers and their actuating mechanism, FIG. 38 is a partial bottom view of the gripper finger control mechanism, taken on line 38—38, of FIG. 34, FIG. 39 is a sectional end elevation of the gripper finger actuating mechanism, taken on line 39—39 of FIG. 37, FIG. 40 is a sectional end elevation of the horizontal arm, illustrating the adjustable wrist motion arresting mechanism, taken on line 40—40 of FIG. 34, FIG. 40A is a sectional end elevation of the horizontal arm similar to FIG. 40 but with the wrist motion stop pins set in different relation, FIG. 41 is another sectional end elevation of the horizontal arm, illustrating the wrist motion control mechanism, taken on line 41—41 of FIG. 35, FIG. 42 is a sectional side elevation of the programming arm, FIG. 43 is a sectional plan view of the programming head, taken on line 43—43 of FIG. 42, FIG. 44 is a partial sectional side elevation of the programming head taken at 90° from the section shown in FIG. 42, FIG. 45 is a side elevation of one of the linear potentiometer in the programming head illustrating the mounting and support of the same, FIG. 46 is a schematic flow diagram illustrating a suitable system for the machine, FIG. 47 is a diagram illustrating a suitable electrical control circuit for recording a programmed operation of the machine, FIG. 48 is a diagram illustrating a suitable electrical circuit to automatically actuate the machine in accordance to the program recorded on a tape, FIG. 49 is an electrical diagram illustrating the components of a suitable error detector, and FIG. 50 is a diagram of a suitable signal detector.

With reference to the drawings, the article handling and transfer apparatus selected for purposes of illustrating the invention comprises a reciprocatory horizontal arm A provided with article or object handling and manipulating means. The arm in the embodiment shown which is provided with a suitable gripping device is movably supported by a carriage C which slidably engages with a vertical column B on which said carriage C is vertically raised and lowered. The vertical column B at its bottom end is rotatably supported and turned in clockwise or counter-clockwise direction in a manner described hereinafter.

The hydraulic power unit for vertical column B of the machine is actuated by means of controlled hydraulic pressure by means of a suitable hydraulic power unit. The hydraulic power unit disclosed consists of a motor M which drives a pump P connected by means of suitable tubes to a reservoir R and a filter unit F. From the filter unit F suitable tubes branch out to the hydraulic actuator of the vertical column B, the hydraulic actuator for the carriage C and the hydraulic actuator for the horizontal arm A. There is also a tube which connects the filter unit F with a suitable accumulator D. To properly control the temperature of the hydraulic fluid, a suitable radiator E is provided through which the hydraulic fluid may be directed.

The hydraulic power unit is mounted on a suitable bed plate 70 (FIGS. 1 and 2) to which is also secured a suitable shaped housing 72 serving as support for the article handling and transfer apparatus.

Bed plate 70, preferably is provided with wheels (not shown) which enable it to be moved readily from one operating station to another. These wheels can be mounted in a manner for movement to an inoperative position out of contact with the floor when the machine has been located at an operating station.

Housing 72, by means of suitable bearings, rotatably supports a vertical sleeve 74 (FIG. 4) having an upper flange 76 secured to a vertical column supporting plate and manifold 78 on which in turn is mounted the vertical column B. The vertical sleeve 74 serves as a driven member to impart clockwise and anticlockwise rotary motion to the vertical column B and for this reason carries a double sprocket 80 which is keyed thereto. The double sprocket 80 (FIGS. 4, 8 and 9) engages with a pair of chains 82, one end of each of which is connected to a tie bar 84 while the other ends are connected to a tie bar 86. Both tie bars are arranged in vertical position and bar 84 at its center is secured to the free end of a plunger or piston 88 projecting from a horizontally mounted cylinder 90. Bar 86 at its center position is also mounted to the free end of a plunger or piston 92 projecting from a horizontally mounted cylinder 94.

Cylinders 90 and 94 are mounted in the same plane and are parallel to each other, as illustrated in FIGS. 4, 8 and 9. The front caps 96 and 98 of the cylinders 90 and 94, respectively, are mounted on and connected to a manifold block 100 which in turn is held by and secured to a suitable outside surface of housing 72 (FIGS. 4, 8 and 9). Manifold block 100 is provided with a pair of ducts 102 and 104 (FIGS. 4 and 8) which by means of tubes 106 and 108 (FIG. 4), respectively, are connected to the pressure and return lines, respectively, of the hydraulic system. Both ducts 102 and 104 of the manifold block 100 are connected to suitable ducts in a safety valve 110 connected to an electrohydraulic flow control servo valve 112, such as manufactured by Moog Servocontrols, Inc. in East Aurora, New York. Servo valve 112 is secured to the safety valve 110 (FIGS. 4, 8 and 9) mounted on manifold block 100. Since the same type of safety valve is used in connection with two other manifolds in the machine a complete description of said safety valve which is shown in detail in FIGS. 28, 29 and 30, will follow hereinafter.

Two additional ducts 114 and 116 in manifold block 100 (FIG. 8) are provided to permit hydraulic fluid to reach cylinders 90 and 94, respectively, through openings in their respective front caps 96 and 98, as illustrated in FIG. 8. Since the outside diameter of the plungers on pistons 88 and 92 are slightly smaller than the inside diameter of their respective cylinders the hydraulic fluid entering through the front caps of the cylinders passes through this provided clearance and builds up pressure on the rear end of the pistons which in the controlled operation of these cylinders drives the pistons to the left, as shown in FIG. 8 in a forward direction. Secured to the rear end of each plunger or piston is a guide disc or stop 118 (FIG. 8) each of which is provided with suitable flats 120 which permit the hydraulic fluid to reach the rear end of the piston. The servo valve 112 controls the flow of the hydraulic fluid in such a manner as to permit fluid to enter only into one cylinder at the time, causing that particular piston to move forward. Since, as described heretofore, both pistons are connected by chains 82 to each other, and since these chains run over sprocket 80 the forward movement of one piston causes the other piston to move backward which, due to the absence of pressure in the same, simply presses the fluid from the cylinder through the above-mentioned clearance between piston and cylinder out of the front cap of this particular cylinder. Leakage of fluid from cylinders 90 and 94 through the front caps 96 and 98 is prevented by suitable seals 122 and the rear end of each cylinder is tightly closed by a cap 124. By alternately supplying fluid pressure first to one and then to the other cylinder 90, 94 the chains 82 impart an oscillating motion to sprocket 80, and vertical column B is swung or oscillated about its longitudinal axis to any desirable degree depending on the setting and action of servo valve 112.

A fine tooth gear 126 (FIGS. 4 and 9), which forms a part of one of the resolver systems, described hereinafter, is secured to sleeve 74. Gear 126 meshes with a pair of small gears 128, one of which is mounted on a vertical shaft 130 while the other one is loosely mounted on said shaft but connected to the latter by means of a torsion spring (not shown) and thereby prevents back lash. Vertical shaft 130 is rotatably supported by suitable bearings in bracket 132 secured to the outer wall of housing 72.

*Vertical column and drive assembly*

Vertical column B consists of a suitably shaped column member 134 (FIGS. 1, 2, 4, 12 and 14) capped by a cover plate 146 and at its bottom portion suitably secured to the supporting plate and manifold 78. Within column 134 is mounted a transverse vertical supporting plate 136 having secured thereto two vertically spaced, vertical cylinder supporting blocks 138 and 140. Lower block 138 holds the upper end of a vertically downwardly projecting cylinder 142. Upper block 140 holds the lower end of a vertically upwardly projecting cylinder 144. The bottom end of lower cylinder 142 is closed. From its upper end projects a plunger or piston 148, the upper free end of which is secured to the lower side of a floating yoke block 150 (FIG. 15). The top end of upper cylinder 144 is also closed. From its bottom end projects a plunger or piston 152, the lower free end of which is secured to the topside of floating yoke block 150.

Secured to the center of floating yoke block 150 is a horizontal stud shaft 151 (FIG. 15) which rotatably supports gear 154. Gear 154 on one side engages with a vertically mounted stationary gear rack 156 the upper end of which is secured to the upper block 140 while the lower end of this rack is secured to the lower block 138. The other side of the gear 154 engages with the free floating end of gear rack 158 which at its upper end is pivotally suspended from a forked bracket 160 fixed to the rear side of carrier housing 162 of the carriage C (FIGS. 4, 14 and 15). In order to assure perfect engagement of the gear racks 156 and 158 with the gear 154 at all times the yoke block 150 carries a pair of spaced plates 164 between which on one end is pivotally mounted a roller 166 which engages with the outer edge of the floating gear rack 158. The other ends of plates 164 are adjustably secured to a pair of spaced vertical bars 168 (FIG. 15) between which are pivotally mounted a pair of vertically spaced rollers 170 which engage with the outer edge of the stationary gear rack 156. Due to the angular slots 172 in the spaced vertical bars 168 to which plates 164 are fastened by suitable screws 165 in plates 164, any back lash between the gear 154 and the racks 156 and 158 can readily be eliminated.

The above described constructions and relation of racks 156 and 158 to pinion 154 is, therfore, such that the movement of yoke block 150 with its supported gear 154 causes transmittal of vertical linear motion to carriage C which is twice as far and fast as that of the yoke block. There is, therefore, a two to one magnification of the cylinder movement. By means of a more elaborate gearing system, greater multiplication of movement could be obtained. The construction just described makes it possible to maintain the length of cylinders 142, 144 and their operating pistons at a minimum at all times. This makes it possible to construct the machine with a minimum height and bulk which can be of extreme importance in a modern plant where space saving without loss of operating efficiency is highly desirable.

The top end of lower vertical cylinder 142 is connected by tube 174 to duct 176 (FIGS. 4, 5 and 6) in a vertical manifold block 178 which is secured to both the outer wall of the member 134 and supporting plate and manifold 78. The lower end of the upper vertical cylinder 144 is connected by means of tubes 180 and 182 to duct 184 in vertical manifold 178 (FIGS. 5 and 6). Vertical manifold 178 is furthermore provided with ducts 186 and 188 which in turn are connected with a return, and a pressure line duct 190 and 192, respectively, in the supporting and manifold plate 78 (FIGS. 5, 6 and 10). The pressure line duct 192 of manifold plate 78 is connected by means of a vertical tube 194 to a duct 196 in swivel head 198 (FIGS. 3, 4 and 11) which is suitably secured to the bottom portion of the vertical drive sleeve 74 and which oscillates therewith. The lower portion of swivel head 198 is rotatably seated in stationary hub bracket 200 (FIGS. 3 and 4) which is suitably mounted within housing 72. The vertical portion of duct 196 in swivel head 198 is located exactly on the axial center thereof and leads into a horizontal duct 202 provided in the bottom portion of hub bracket 200, as illustrated in FIG. 3.

Duct 202 is connected by tube 204 to the hydraulic system of the machine. The return duct 190 in manifold plate 78 is connected by a vertical tube 206 to duct 208 in swivel head 198. The duct 208 leads to a chamber 210 (FIG. 3) provided in hub bracket 200. Chamber 210 is also connected by tube 212 to the hydraulic system of the machine. A safety valve 214 is suitably secured and connected to vertical manifold 178 by ducts 186 and 188. This safety valve is of the same construction and operation as safety valve 110 mentioned hereinabove. Secured and connected to safety valve 214 is an electro hydraulic flow control servo valve 216 (FIGS. 4 and 12), such as manufactured by Moog Servocontrols, Inc.

Since lower cylinder 142 and piston 148, and upper cylinder 144 and piston 152 are employed to raise and lower the carriage C on the vertical column B, the lower piston 148 is of slightly larger diameter than piston 152 to compensate for the weight of the arm carrying carriage C and thus provide for a better balanced hydraulic system. Pistons 148 and 152 are slightly smaller in diameter than the inside diameter of their respective cylinders 142 and 144 so that hydraulic fluid introduced near the top end of the cylinders can pass through this clearance and accumulate and work against the back end of the pistons in the same manner as in the cylinders 90 and 94 illustrated in FIG. 8.

In the embodiment of the invention illustrated, carriage C is guided along the vertical column B by means of four pairs of angularly mounted rollers 218 which engage with a pair of vertical triangularly shaped tracks or rails 220 secured to or formed integrally with the outer side faces of column member 134. Guide rollers 218 are pivotally mounted on suitable lugs which are integral with the carrier housing 162 which is actually supported as well as raised and lowered by means of the floating gear rack 158 which engages with the gear 154 carried by the yoke block 150. As described heretofore, yoke block 150 is connected to the lower and upper piston 148 and 152, respectively, and is raised and lowered thereby. Gear 154 is so designed that when turning against the stationary rack 156 during the up or down movement of the yoke block 150 the floating gear rack 158 will move up or down at a ratio of 2:1 in relation to the movement of the pistons 148 and 152 and yoke block 150, thereby eliminating excessive piston movement and awkward construction due to lengthy cylinders.

To provide for the automatic removal for any air that may be introduced into the hydraulic system during the operation of the machine, the upper end of upper vertical cylinder 144 is connected by port 222 to a suitable duct 223 in cap plate 146 (FIGS. 4 and 42), which in turn by tube 224 is connected to return duct 186 in vertical manifold 178. Port 222 is provided with a rigid porous material insert 226 which effectively allows air to escape but prevents any substantial leakage of oil. This insures continued accurate operation of the machine without the need for periodically bleeding any entrapped air from the hydarulic system. We have found that a porous metal such as used in oilite bronze gives good results.

As mentioned heretofore the carriage C carries the horizontally reciprocating arm A which on one end is provided with a suitable gripping device G employed for the purpose of picking up objects to be transferred from one spot to another.

*Horizontal operating arm*

The arm A in the illustrated embodiment of the invention, consists of a tubular housing 228 (FIGS. 1, 2, 4, 13, 14, 19, 34, 35 and 36) which is slidably supported in carriage C by a plurality of spaced rollers 230 (FIGS. 13 and 19) arranged in such a manner as to permit longitudinal movement of the tubular housing 228. Rollers 230 are pivotally supported by suitable individual brackets 232, all of which are secured to carrier housing 162. Tubular housing 228 is provided with an external gear rack 234 running parallel to its axis and extending almost over its entire length. As shown, rack 234 forms an integral part of housing 228. However, if desired, rack 234 could be a separate element suitably attached to housing 228. Adjacent each side of gear rack 234 is a flat surface or track 236 running the entire length of tubular housing 228. A roller 238 having two raised shoulders 240 straddles gear rack 234 and runs on the two flat tracks 236 (FIG. 19) on tubular housing 228 and prevents the latter from turning. Roller 238 is pivotally mounted on a vertical stud 242 (FIGS. 13 and 19) which is held by a forked bracket 244 secured to suitable lugs of carrier housing 162.

Rack 234 engages with a gear 246, the oscillation of which effects a horizontal reciprocating movement of said tubular housing 228. Gear 246 is slidably mounted on vertical shaft 248 provided with a pair of 180° opposed V-shaped key-ways 250 extending along its full length. Gear 246 is formed with a lower hub 252 which carries a pair of V-shaped keys 254 which effect an engagement of gear 246 with the vertical shaft 248. By selecting V-shaped key-ways and keys and securing the latter on hub 252 by screws 249, in such a manner that shims 247 of different thicknesses may be placed under their flanged mounting (FIG. 13), play between gear and shaft can readily be eliminated at all times. The upper hub 256 of gear 246 (FIG. 4) is mounted in a suitable bearing 258 which is integral with a plate 260 mounted on a fork-shaped lug of the carrier housing 162. This arrangement assures that the gear 246 always remains in proper engagement with the gear rack 234 of the tubular housing 228 as well as with the vertical drive shaft 248 during the raising and lowering of the carriage C.

The vertical drive shaft 248 at its upper end is rotatably supported by a suitable bearing 262 fastened to the lower side of the cap plate 146. The lower end of vertical drive shaft 248 is rotatably supported by a suitable bearing bracket 264 (FIGS. 1, 4, and 12) which in turn is secured to the top side of a housing 266 which contains the driving unit for the vertical shaft 248 and consequently for the horizontal arm A.

*Hydraulic system for horizontal arm*

Housing 266 is suitably mounted on the top side of the manifold plate 78 and is provided with ducts 268 and 270 (FIG. 16) which connect with port 272 (FIG. 10) of duct 192, and port 274 of duct 190 (FIG. 10), respectively of manifold plate 78. Ducts 268 and 270 are also connected to a safety valve 276 (FIGS. 1, 16 and 18) which is secured to the bottom side of the forward portion of housing 266. Safety valve 276 is of the same type and construction as safety valves 112 and 214, mentioned heretofore and will be described in detail hereinafter. Connected with the safety valve 276 and mounted beneath the same is another conventional electro hydraulic flow control servo valve 278 (FIG. 1) which also may be of the type manufactured by Moog Servocontrols, Inc.

Housing 266 is provided with a pair of parallel cylinder bores 280 and 282 supporting reciprocating pistons 284 and 286, respectively. A double sided gear rack 288 is attached to one end of piston 284. In a similar manner the other piston 286 has secured to it a double sided gear rack 290 (FIGS. 16 and 17). Gear rack 288 engages with gear 292 and gear 294 while gear rack 290 engages with gear 296 and also with gear 294, as illustrated in FIGS. 16 and 17. Gears 292 and 296 are provided with stud shafts 298 and 300, respectively, both of which are supported in suitable bearings in housing 266. Gear 294 is provided with a drive shaft 302 which projects upwardly and out of housing 266. Shaft 302 is also supported by suitable bearings in housing 266.

Secured to the upper end of shaft 302 is a gear 304 (FIGS. 4, 12 and 17) which meshes with gear 306 mounted on the lower end of vertical drive shaft 248. It will be apparent that when hydraulic fluid flows through duct 308 (FIGS. 16 and 18) from safety valve 276 into cylinder 280 it actuates piston 284 and causes gear rack 288 to move to the right or in the direction of the arrow indicated in FIG. 16. This movement of rack 288 causes gear 294 and consequently shaft 302 to rotate in a clockwise direction as viewed in FIG. 16. Since gear 294 also engages with rack 290 the latter consequently will be moved in the opposite direction as indicated by the arrow in FIG. 16. Rack 290 being secured to piston 286 in cylinder 282 causes it to move in the same direction forward and force the fluid which is ahead of it through a duct 310 out of cylinder 282 and through safety valve 276 and servo valve 278 back into the hydraulic system.

Depending on the degree of clockwise rotation of shaft 302 desired, the servo valve 278 effects a reversing of the flow of the hydraulic fluid and permits the latter to enter through the safety valve 276 and duct 310 into cylinder 282 causing piston 286 to be depressed and thus effecting a backward movement of rack 290 which results in a counter-clockwise rotation of gear 294 and consequently of shaft 302. The counter-clockwise rotation of gear 294 causes rack 288 and piston 284 to move now in a forward direction, and thus forcing the fluid ahead of piston 284 through duct 308 out of cylinder 280. It can readily be seen that by alternately directing fluid pressure into one and then into the other cylinder the driving shaft 302 extending from gear 294 may be oscillated to any desired degree. Since the gear 304 on shaft 302 engages with the gear 306 on the vertical shaft 248 the controlled oscillating rotation is transmitted to the latter.

In order to assure a perfectly smooth running operation and to prevent any possible back lash the shaft 302 carries, rigidly attached thereto, a gear 312 which in turn engages with a gear 314 and also with a gear 316 (FIGS. 16 and 17). The latter is mounted on the hub of gear 296 and gear 314 is secured to the hub of gear 292 (FIG. 17). The cooperative relationship between the teeth of gears 292, 294, 312 and 314 and rack 288, and between gears 294, 296, 312 and 316 and rack 290 substantially eliminate back lash. The top ends of cylinders 280 and 282 in housing 266 are tightly sealed and closed by means of suitable plugs 318 and 320, respectively. The rear end of housing 266 is provided with a suitably shaped coverplate 322 to accommodate and protect the free ends of the reciprocating gear racks 288 and 290.

The ratio of the several gears 294, 304, 306, and 246 is important in order to hold to a minimum the space to be occupied by the horizontal drive unit including pistons 284 and 286. We have found that satisfactory results are obtained when the gear ratio between gears 304 and 306 is approximately 3:1 and that between gears 246 and 294 is approximately 1.66:1 so that total ratio in the gear train including these four gears is approximately 5:1. This means that for each increment of movement of either of the pistons 284 and 286 arm A will move five times that distance. It will be seen therefore, that by means of the structure described an extremely compact operating unit is made possible although the travel of arm A is relatively great. This construction contributes further to a compact, space saving machine.

As mentioned heretofore, the oscillating motion transmitted to vertical shaft 248 by the driving unit just described is also imparted to the gear 246 which in turn through its engagement with gear rack 234 on tubular housing 228 effects horizontal reciprocating motion of the arm A. It was also mentioned heretofore that the horizontally reciprocating arm A at one end carries a gripping device G designed for the purpose of engaging with and holding, orienting or positioning and releasing objects or articles. Obviously, arm A may carry and have operatively associated therewith many different types of work handling, fabricating and manipulating devices in order to fully implement the machine.

*Work handling device*

Gripping device G and its actuating mechanism illustrated in FIGURES 34 to 41 inclusive consist of a pair of suitably shaped co-acting gripper fingers 324 and 326. Gripper finger 324 (FIGURE 37) is detachably as well as adjustably attached by screw 328 to an arm 330 (FIGURES 34, 37, 38 and 39) which in turn, is adjustably secured by screw 332 to the top portion of the hub of a gear 334 rotatably supported by bearing plate 336 and a stud 338. Gripper finger 326 is also detachable as well as adjustably fixed by screw 40 to an arm 342 which in turn, by means of screw 344, is adjustably secured to the top portion of the hub of a gear 346 which is also rotatably suspended from and supported by the top bearing plate 336. The latter is in rotatable engagement with a suitable ball bearing race and also acts as a coverplate for the gripper finger housing 348. Ball bearings 350 and suitable clamping members 352 rotatably support and secure housing 348 to one end of the tubular member 228 of horizontal arm A.

Gripper fingers 324 and 326 are connected to each other through arms 330 and 342 and gears 334 and 346. Their opening and closing is accomplished through a reciprocating gear rack 354 which engages with gear 334 as illustrated in FIGURES 34, 37 and 39. Gear rack 354 forms an extension of, and is integral with the upper half 356 of a split sleeve L (FIG. 37), which loosely surrounds the upper half of the front portion of a horizontal rod 358, as illustrated in FIGURES 34, 39 and 40. The top side of the upper half sleeve 356 is provided with a key 360 (FIGS. 34 and 40) which slidably engages with a longitudinal keyway 362 provided in the bore of the stepped down hub portion 364 of the gripper housing 348. The upper half sleeve 356 carries a pin 366 which engages with the forward end of sleeve 368 loosely surrounding horizontal rod 358 and which is located in the center portion of the tubular member 228 and extends almost through the entire length of the latter. A reasonable length of the end portion of sleeve 368 is stepped down from a round outside diameter to a hexagon shape 370 with the opposite end of same butting against one side of a slidably mounted trust bearing 372. The other side of bearing 372 is engaged by the end of a sleeve piston 374. The head end 376 of which extends into a cylindrical bore 378 of an hydraulic actuator housing 380 which is rigidly attached by a suitable clamp 382 to the end of tubular member 228 of arm A.

The outside diameter of the head end 376 of sleeve piston 374 is slightly smaller than the inside diameter of bore 378 so that hydraulic fluid entering into bore 378 through tube 384 can pass through this clearance and effect pressure on the back end of head end 376. Another piston 386 is located in bore 378 and is longitudinally locked to sleeve 388 by a pair of spring collars 390 and 392. Sleeve 388 is rotatably supported by rod 358 but longitudinally locked thereto on one end by a trust bearing 394 butting against a spring collar 396 and at the other end by a trust bearing 398 held by nut 400 on rod 358 (FIG. 35). Piston 386 is provided with proper piston rings or seals 402 so that no fluid may pass said piston. This arrangement divides the bore 378 practically into two separate chambers so that the fluid entering this bore via the tube 404 will only effect a movement of piston 386 while fluid entering bore 278 via tube 384 will only actuate sleeve piston 374, the head end 376 of which incidentally engages slidably with the sleeve 388 and is provided with a proper seal ring 406. Therefore, any hydraulic pressure transmitted to piston 386 will cause the rod 358 to move in a horizontal forward direction indicated by an arrow in FIGURE 35.

The lower half 410 of the split sleeve L (FIGS. 34, 37, 39 and 40) is secured by a pair of pins 408 to the front end of rod 358 and any movement imparted to rod 358 is also transmitted to the lower half 410 of split sleeve L. Similar to the construction of the upper half 356 of split sleeve L, the lower half 410 is also provided with an extension formed into a gear rack 412 which has the identical design of gear rack 354 extending from the upper half 356 of the split sleeve L. Although the upper and lower half of the split sleeve L and their respective gear racks 354 and 412 slidably contact each other at a common center line, the two units may move independently of each other. The lower gear rack 412 engages with a gear 414 (FIGS. 34 and 39) which is secured to a stud shaft 416 which is integral with and extends upwardly from a swing member 418 which by means of a downwardly extending hub and stud is rotatably supported by a suitable bearing in the lower portion of gripper finger housing 348 (FIGS. 34 and 39). Gear 414 is of the same diameter and shares the same center as the gear 334, which engages with the upper gear rack 354. As illustrated in FIGURES 34 and 39, stud 338 which aids in the support of gear 334 is a turned down extension of the stud shaft 416. Gear racks 354 and 412 are held in engagement with their respective gears 334 and 414 by means of a pair of rollers 420 and 422, respectively both of which are rotatably supported by a vertical stud 424 secured in housing 348.

Swing member 418 is provided with an upwardly projecting lug 426 (FIGS. 34 and 37) to the top end of which is secured by screw 428, disc-shaped top bearing plate 336. As illustrated in FIGURE 34, this plate is rotatably centered about a suitable bushing 430 (FIG. 34) carried by the hub of gear 334. When gear rack 412 is moved in a forward direction, or to the left as viewed in FIGURE 34, gear 414 and consequently swing member 418 and bearing plate 336 are rotated in a counterclockwise direction (as viewed in FIGURE 37), and conversely when gear rack 41 is moved in a rearward direction plate 336 is moved in a clockwise direction. This operation results in the cooperative movement of gripper fingers 324 and 326 in a counterclockwise or clockwise direction.

In order to maintain fingers 324 and 326 in the same relation to each other, that is, in open or closed position during swinging motion, both gear racks 354 and 412 actuates gears 334 and 414. When a closing or opening of the fingers is desired, only rack 354 is operated. The closing or opening of fingers 324 and 326 may be associated with the gripping and relasing an object or article S as illustrated in FIGURE 37.

In order to provide means to stop the clockwise or counterclockwise swing of the gripper fingers at a desired degree, the swing member 418 carries a pin 432 which projects vertically downward into a U-shaped channel 434 (FIGS. 34 and 38) provided in the lower portion of housing 348. Channel 434 is provided with a bottom plate 436 and is closed at its ends by means of a downwardly projecting wall 438. Within channel 434 are movably confined a plurality of rollers 440 placed in upright position and arranged in two rows in such a manner that one row is in front of pin 432 while the other row is placed in back of it, as illustrated in FIGURE 38. The rear end of one row of rollers 440 is contacted by an adjusting screw 442 adjustably mounted in wall 438 of the channel 434. The rear end of the other row of rollers is also contacted by an adjustable screw 444 projecting into the other end of the channel 434 through wall 438. By advancing or retracting one or the other, or both screws 442 and 444, the space between the front rollers of each row may be changed to any desirable degree within the 180° curved portion of the U-shaped channel 434. Since the movement of pin 432 projecting from oscillating swing member 418 is confined to above mentioned space, the horizontal swing of the gripper fingers 324 and 326 may be adjusted to any desirable degree within a radius of 180°.

Since it may be desirable to rotate the article carrying gripper fingers about a horizontal axis, the hexagon shaped end 370 of sleeve 368 which effects the opening and closing of fingers 324, 326, engages with a hexagonal bore of member 446 (FIGS. 35 and 41) which is slidably, as well as rotatably supported within stationary cam sleeve 448. This sleeve is mounted within the tubular member 228 and is threaded onto one end of a sleeve bushing 450, held stationary against the tubular member 228 by the clamp 382, mentioned heretofore (FIG. 35). Member 446 at each end is provided with a slidably mounted trust bearing 452 and 454. Bearing 452 engages also with one end of a sleeve piston 456, slidably mounted in sleeve bushing 450 which also forms the cylinder for sleeve piston 456. The other end of the sleeve piston 456 is provided with a suitable seal 457. The space 458 adjacent the seal represents a cylinder in which sleeve piston 456 operates and is connected to the cylinder bore 378 of hydraulic actuator housing 380, as illustrated in FIGURE 35, by duct 460 in the end of sleeve bushing 450 and duct 462 in housing 380. The other trust bearing 454 of member 446 engages with one end of a long compression spring 464, the other end of which is in contact with a suitable disc 466 secured within the forward end of a stationary extension sleeve 468 threaded into the forward end of the stationary cam sleeve 448. Member 446 carries a cam roller 472 on stud 470 (FIGS. 35, 36 and 41) which engages with a suitable cam track 474 provided in the stationary cam sleeve 448, as illustrated in FIGURES 35 and 36.

When hydraulic pressure is introduced through tube 404 into the back portion of the bore 378 of the hydraulic actuator housing 380, this pressure through ducts 462 and 460 to cylinder 458 acts upon the end of sleeve piston 456 resulting in its forward motion. Since sleeve piston 456 through trust bearing 452 engages with member 446 the latter is also moved in a forward direction. Since member 446 through roller 472 engages with spiral cam track 474 of stationary cam sleeve 448, member 446 besides being moved forwardly is also rotated. Due to the fact that member 446 is slidably mounted on the hexagon shaped end portion 370 of sleeve 368, this axial rotation is transmitted to sleeve 368 and in turn through half sleeve 356, key 360 and stepped down hub portion 364 imparted to the rotatably mounted gripper housing 348 which effects the axial rotation of article carrying gripper fingers 324 and 326. This rotation of the gripper mechanism may be referred to as the wrist motion of the grippers. As soon as the hydraulic pressure in the rear end of cylinder bore 378 in housing 380 is released, tension spring 464 which was compressed during the forward movement of member 446 expands, thereby pressing the latter, and also the sleeve piston 456 back to their original positions which causes gripper housing 348 and fingers 324 and 326 to return to their original horizontal position.

In order to constrain the rotation of the gripper fingers through any predetermined angle, the outer periphery of hub portion 364 of the gripper housing 348 is provided with two parallel spaced semi-annular groves 476 and 478 into which project pins 480 and 482, respectively (FIGS. 34, 40 and 40A). Pins 480 and 482, are mounted in worm gear rings 484, and 486 respectively. Both worm gear rings 484 and 486 are rotatably mounted on the hub portion 364 of gripper housing 348 within clamping member 352. Worm gear ring 484 engages with worm 488, and worm gear ring 486 engages with worm 490. Both worms 488 and 490 are rotatably confined in a suitable cylindrical chamber provided in the clamping member 352. Each worm 488 and 490 at one end is also provided with a suitable socket 492 into which a socket wrench may be inserted to permit manual turning thereof. A turning of the worms also effects rotation of their respective worm gear rings which in turn will cause the respective pins to move in circular rotation within their respective semi-annular grooves in the hub portion 364 of the gripper housing 348. When both pins 480 and 482 are set in line as illustrated in FIGURES 34 and 40, the gripper housing 348 and fingers 324 and 326 may be rotated a full 180°. However, if pin 482 is located in the position illustrated in FIGURE 40A, gripper housing 348 can only turn approximately 45° since at that point the upper end of the semi-annular groove 476 will contact stop pin 482 and cause the arrest of the gripper housing. It may be readily seen that by turning the worms 488 and 490 the stop pins 480 and 482 respectively, may be moved to any position to obtain the desired angle of the gripper fingers and thus the desired degree of wrist motion of the same.

By replacing stationary cam sleeve 448 with a cam sleeve having a differently curved cam track, the wrist motion of the gripper may be modified to suit any desirable operation. In case the requirements call for an independently timed wrist motion of the grippers, the connection of the duct 462 for the cylinder bore 378 of housing 380 may be plugged and provided with a tube (not shown) leading to a separately activated hydraulic control valve (not shown).

As illustrated, in FIGURE 35, the hydraulic fluid delivered to the rear portion of cylinder bore 378 by means of tube 404 will act upon the piston 386 and drive it forward. Since piston 386, as described above, is connected to rod 358 which in turn is connected to gear rack 412, the swing member 418 and disc 336 are actuated to effect the desired swing of the gripper fingers. Since the head end 376 of sleeve piston 374 (FIGURE 35) is held against the collar 392 adjacent to piston 386, the forward motion of the latter also causes sleeve piston 374 to move forward, which in turn imparts its forward motion to sleeve 368 and consequently to the gear rack 354 which through gear 334 effects the opening and closing of the gripper fingers as described heretofore. However, during the initial forward motion of piston 386 and sleeve piston 374, no opening and closing of the gripper fingers is effected since forward motion of both gear racks 354 and 412 are necessary to keep both gripper finger 324 and 326 in the same relative position during swinging motion of the same. Only after hydraulic fluid is admitted through tube 384 to the forward portion of cylinder bore 378 which will act upon the head end 376 of sleeve piston 374 and drive it forward and ahead and away from piston 386 is a closing of the fingers 324 and 326 is effected. Compression spring 494 which surrounds sleeve 368 and is confined between the collar 496 on said sleeve 368 (FIGURE 34) and the end of sleeve 498 which is threaded only to the rear lower half 410 of the split sleeve L is then compressed. When the hydraulic pressure against the head end 376 of sleeve piston 374 in the forward portion of cylinder bore 378 is released, spring 494 through collar 496, sleeve 368 and trust bearing 372 will return the sleeve piston 374 so that its head end 376 again engages with the collar 392 adjacent piston 386 and thus effect an opening of the gripper fingers 324 and 326. Another compression spring 500 (FIG. 34) surrounding sleeve 398 and confined between an adjustable collar 502 on said sleeve and the rear face of the gripper housing hub 364 which had been compressed during the forward motion of the lower half 410 of the split sleeve L caused by the forward motion of piston 386 will return the latter to its backmost position in cylinder bore 378 of housing 380 when the hydraulic pressure is released.

*Manifold and hydraulic system*

In order to distribute properly the hydraulic fluid to all hydraulic actuators of the machine, the invention includes the provision of suitable distributing system, which for purposes of illustration may be manifold block 504 (FIGS. 1 and 20 to 27 inclusive), connected by tube 524 to the hydraulic pump P. To manifold block 504 are mounted as well as connected, an unloading valve 506, a solenoid flow control valve 508, a pressure reducing valve 510 and two three-way solenoid valves 512. Unloading valve 506 (FIGS. 20 and 21) is any type of conventional valve employed for the purpose of directing or returning any surplus hydraulic fluid through a return duct 538 in manifold block 504 back to the tank or reservoir R by means of a tube 520. As illustrated in FIGURE 25, the return duct 538 is also connected to an L-shaped duct 534 in which is mounted a suitable conventional thermostatic valve 514, which when the fluid reaches a certain predetermined temperature, closes the port to the return tube 520 and directs the fluid through the duct 534 and tube 518 to a suitable radiator E to effect cooling of the fluid before the latter returns to the reservoir R.

Figure 1:
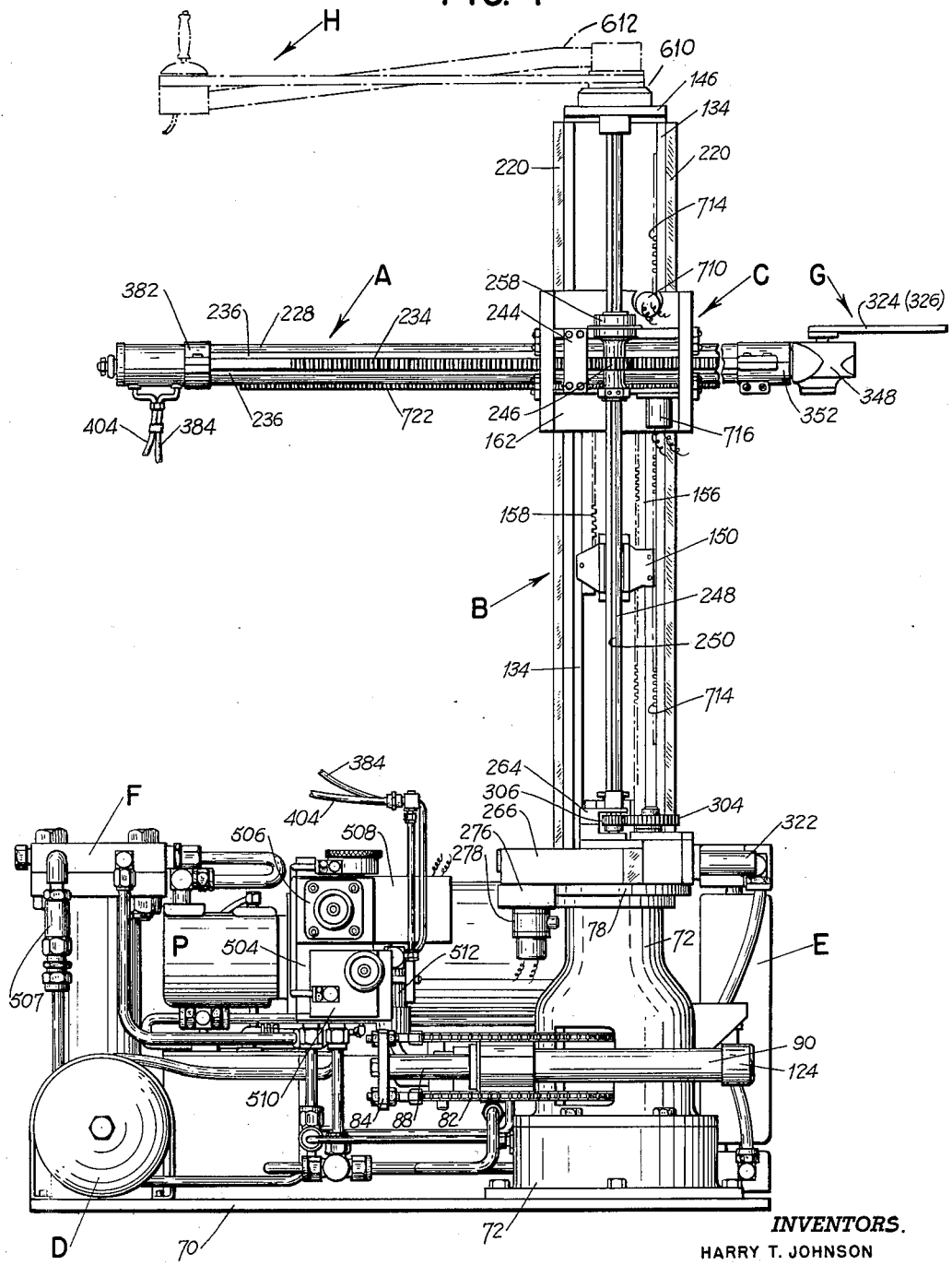
FIG. 1 is a front elevation of the article handling and transferring apparatus.

To take care of a possible internal leakage of valve 506 the latter is also connected to a drain duct 530 (FIGS. 20 and 27) which in turn leads into the drain duct 540. Valve 506 is actuated by means of hydraulic pressure forwarded thereto from duct 532 (FIGS. 20, 22 and 27) connected to the pressure duct 547. A suitable unloading valve 506 is a QUA–170–EITX type valve manufactured by the Double A Products Co. of Manchester, Michigan. Solenoid flow control valve 508 is an electrically controlled three way valve which controls the flow of hydraulic fluid through a duct 548 in manifold 504 (FIG. 21) and tube 528 through a pressure duct 542 in the manifold block 504 to a conventional accumulator D suitably secured to bed plate 70 of the machine (FIG. 1).

Solenoid control valve 508 also is connected to a drain duct 541 in manifold block 504 which (FIG. 21) is connected by tube 522 to reservoir R to permit drainage of the valves. Valve 508 is connected to return duct 538 by duct 550. Pressure reducing valve 510 also mentioned above, is employed for the purpose of controlling and maintaining the hydraulic pressure delivered to the system at a predetermined value. Fluid pressure from filter F through a tube 526 enters the pressure duct 547 (FIG. 27) in manifold block 504 connected to pressure duct 546 (FIGS. 21, 23 and 27) connected to a pressure duct 536 leading into the pressure reducing valve 510 (FIG. 23). The latter is provided with a pressure outlet connected to pressure duct 205 in the manifold block 504. Pressure duct 205 is connected by tube 204 to pressure duct 202 in hub bracket 200 shown in FIGURE 4 and described heretofore. Pressure reducing valve 510 also is connected to drain duct 544 (FIG. 22) leading into a drain duct 540 which is connected to the drain duct 541 of the manifold, as mentioned above. A suitable type of pressure reducing and controlling valve 510 is the QWA-165-2 type also manufactured by the Double A Products Co., Manchester, Michigan.

Each of the two three way solenoid valves 512 mounted on the manifold block 504 as mentioned above, is connected to pressure duct 536 in the manifold block 504 by a duct 513 (FIG. 23). Furthermore, each valve 512 is also connected by a duct 515 to the return duct 538 (FIG. 24), in manifold block 504. The three way solenoid valves 512 are employed for the control of the swing motion of the gripper fingers 324 and 326 and their opening and closing as well as the wrist motion thereof described hereinbefore. For this reason one of the valves 512 (FIGS. 1 and 35) is connected by tube 384 to the forward portion of cylinder bore 378 within housing 380, while the other valve 512 is connected by tube 404 to the rear portion of cylinder bore 378 of the hydraulic actuator housing 380 (FIG. 35).

Manifold block 504 is also provided with a pressure relief valve 516 (FIG. 26) which, should the hydraulic pressure in the system rise above a desired point, opens a port to a bypass duct 552 which then permits the hydraulic fluid to go from the pressure duct 536 directly to the return duct 538. The relief valve 516 shown in FIGURE 26 is of conventional design and further description thereof does not deem necessary.

*Safety valves*

The three safety valves 110, 214 and 276, above referred to, are of identical construction and only one of them is illustrated in detail in FIGURES 28, 29, 30, 31, 32 and 33. The safety valve shown in these figures consist of a body 554 having a back plate 556 secured to one end. Its other end is covered by a manifold plate 558 rigidly attached to valve body 554. Manifold plate 558 is provided with a pressure chamber 594 which is connected by duct 596 to a pressure duct 574 which at its top end leads into a servo-valve while its bottom end is connected to the respective pressure duct of the respective manifold on which said valve is mounted. Pressure chamber 594 is also connected by two parallel spaced pilot pressure ducts 600 and 602 to the forward ends of two parallel spaced cylinders 559 and 561 provided in valve body 554. Each cylinder 559 and 561 contains a pilot piston 560.

The valve body 554 has two cylindrical bores 582 and 584 which are in axial alignment with cylinders 559 and 561, respectively. These bores are connected to the latter by cylindrical bores 555. Each bore 582 and 584 contains a valve plunger 562 (FIG. 29) which at its rear end is slidably supported by means of plunger guide disc 567 while the front end thereof slidably engages in a bore 555. Each valve plunger 562 in each cylinder bore is so arranged that its front end 569 faces the stepped down rear portion 571 of the pilot piston 560 (FIG. 29). Each valve plunger 562 also is provided with a tapered portion 573 which normally is held in engagement with a seat 563 provided at the point where bore 555 joins bore 582 and 584 by means of a calibrated compression spring 564 surrounding the plunger and confined between a suitable flange on the latter and the plunger guide disc 567. Bores 555 are connected by ducts 590 and 592, respectively, to the respective manifold to which the particular safety valve is mounted. Each cylinder bore 582 and 584 is connected by a duct 580 and 578, respectively to the respective servo-valve to which the safety valve is mounted (FIG. 33). Valve body 554 is also provided with a return duct 576 which connects the respective servo-valve to the return duct of its respective manifold.

Return duct 576 (FIGS. 28 and 31) also is connected by duct 586 to a pair of return chambers 587 and 589 located off center and adjacent the rear portion of cylinder bores 582 and 584, respectively, in valve body 554 (FIGS. 28 and 31). Each return chamber 587 and 589 is connected by a duct 588 to the rear portion of the pilot cylinder 559 and 561, respectively, as illustrated in FIGURE 29. To prevent injury to the respective servo-valves due to high pressure each duct 578 and 580 leading thereto is provided with a duct 598 (FIG. 28) each of which is connected to another duct 599 (FIG. 28) each of which connects with the pressure chamber 594 in the manifold plate 558. Each duct 598 is provided with a calibrated compression spring controlled pressure saftey valve 572 which opens when the hydraulic pressure in the cylinders of the actuators rises to a higher value than that of the system pressure in pressure chamber 594.

The safety valve illustrated in FIGURES 28 to 33 inclusive, is provided with a manually operated bypass valve which is employed for the purpose of flushing the hydraulic system of the machine and cleaning the fluid of impurities without having the fluid going through the servo valves. The bypass valve consists of a valve-plunger 566 (FIG. 30) slidably supported in a duct 579 which connects the pressure duct 574 in valve body 554 with return duct 576. Integral with and extending from plunger 566 is a stem 575 which has a threaded portion which engages with threaded bushing 568 secured in valve body 554. A suitable knob 570 is mounted on the free end of stem 575 which extends outwardly from manifold plate 558 of valve body 554. When valve plunger 566 is in its normal position, as illustrated in FIGURE 30, fluid pressure can pass unrestrictedly through pressure duct 574 to its respective servo valve mounted on the valve body 554, as mentioned heretofore. If it should be desirable to flush the system, the operator simply turns knob 570 which causes valve plunger 566 to move in the direction indicated by the arrow in FIGURE 30 until valve plunger 566 reaches its forwardmost position where plunger 566 blocks the upper portion of pressure duct 574 which leads to the servo valve but leaves the lower portion thereof open so that now the hydraulic fluid can pass from the lower portion of pressure duct 574 through now open duct 579 right into return duct 576. In order to flush the system of the entire machine knobs 570 of all three safety valves employed are turned to the bypass position described above, while under normal operation all valve plungers 566 must be in their backward most position as shown in FIGURE 30.

The safety valve shown in FIGURES 28 to 33 inclusive and described above, operates in the following manner. Fluid pressure enters the pressure ducts 574 at its bottom end and passes through the same into the servo valve to which the valve is connected. Since pressure chamber 594 is connected by duct 596 to pressure duct 574, fluid pressure also enters it and is then led through ducts 600 and 602 into the front ends of cylinders 559 and 561 causing the pilot pistons 560 in both cylinders to move to the right, as viewed in FIGURE 29, where they engage the front ends 569 of valve plungers 562 and move them in the same direction also. This movement of valve plungers 562 lifts their tapered portions 573 from their seats 563, thus providing a passage from the cylinder bore 582 to the duct 590 and from the cylinder bore 584 to the duct 592.

As described earlier, each of the three hydraulic driving units which actuate the vertical column B, the carriage C and the arm A are provided with two cylinders which carry alternately reciprocating pistons arranged in such a manner that when one piston is driven forward, the other moves backward and vice versa. Therefore, the driving force or fluid pressure is alternately shifted from one cylinder to the other in each unit and at the required sequence. This shifting of force of fluid pressure is accomplished by the response to the actuation of the electrically operated servo valve of each driving unit which is so designed that it not only shifts the pressure alternately from one cylinder to the other but also permits the fluid employed to drive a piston in its respective cylinder forward to be exhausted from said cylinder and returned to the system. Therefore, when valve plungers 562 in both cylinder bores 582 and 584 are moved by their respective pilot pistons 560 and the servo valve is at the moment in such a position to permit fluid pressure to pass from the duct 574 through the servo valve to duct 580 which leads to the cylinder bore 582 this fluid pressure from the latter can flow past the now open valve seat 563 into the duct 590 which in turn through a duct in the respective manifold is connected with the respective cylinder and effects a driving or forward motion of the respective piston in said cylinder. Since one piston is moving forward and the piston in the second cylinder of the same unit must move backward, the fluid in the second cylinder is exhausted from the same through a duct in the respective manifold block and directed to the duct 592 in the body 554 of the safety valve. Since, as mentioned above, the valve seat 563 in cylinder bore 584 also is open, the return flow of the hydraulic fluid passes from duct 592 through bore 584 and out from the latter through duct 578 and into the servo valve from which it passes into the return duct 576 of the safety valve and from there through a duct in the respective manifold and back into the system. In response to the next controlled operation of the electrically operated servo valve the latter directs the fluid pressure from pressure duct 574 of its safety valve to duct 578 from which it will pass through cylinder bore 584 into the duct 592 which through the respective manifold is connected to the second cylinder of the same unit and imparts driving motion on the piston in the second cylinder which the fluid from the now returning first cylinder through the respective manifold is directed to the duct 590 which through the open valve seat permits the fluid to pass through cylindrical bore 582 and out of the same by means of duct 580 and into the servo valve, from which it is directed to return duct 576 and via the respective manifold back into the system.

Since chambers 587 and 589 in which plunger guide discs 567 of valve plungers 562 are mounted, are connected to the return duct 576 by means of ducts 586, no pressure can build up from accumulated seepage of fluid which may affect the calibrated action of valve plungers 562. Each of the latter is in its rearmost position. Each plunger guide disc 567 is provided with a vertical slot 591 to provide a drainage channel from each cavity in back plate 556 to the respective chamber 587 and 589 in back of the respective cylinder bore 582 and 584. To prevent accumulation of fluid seepage behind each pilot piston 560 which would impair piston action, the rear portion of each pilot piston cylinder 559 and 561 is connected by a duct 595 to duct 588 in turn connected to the chambers 587 and 589, respectively.

Besides lending itself most favorably to a centrally operated safety system, the safety valve illustrated in FIGURES 28 to 33 inclusive, and described above, contains several important features. Since the springs 564 of each valve plunger 562 are so calculated that it takes a predetermined pressure to activate the pilot piston 560 to effect an opening of the valve plunger seat, the machine cannot start operating until this predetermined pressure is reached, and does not allow the flow of fluid from the servo valves to the actuators until the system pressure has reached this predetermined value. It therefore permits normal operation only while this particular system pressure is maintained. If, during operation, the system pressure should drop below a certain value, it will sharply arrest any motion and also cause a hydraulic locking of the actuator units. This safety action takes place when the system pressure drops due to malfunction of any component, any accidental electrical power failure or an intentional cutting of power, either by suitable manually operated safety switches provided on the machine, or pressing of an emergency button. Should, for example, any of the operating components during their movements accidentally encounter an external obstacle which would stop such component or should a valve shut off suddenly causing pressure to build up in the actuator of the same, then this higher pressure acting against the pilot piston in its respective safety valve would reopen the respective plunger valve to permit the high pressure to enter duct 578 or 580—depending upon which cylinder is involved—and then pass through one of the ducts 598 and cause the opening of the respective spring controlled pressure safety valve 572 which in turn through duct 599 is connected to the system pressure chamber 594. Since the system pressure at this moment is lower than the higher pressure thus created in the respective actuator unit, the opening of the pressure safety valve 572 effects an equalization of the two pressures, thus preventing damage to the delicate actuator parts due to sudden high pressure.

*Hydraulic system*

With reference to the hydraulic system illustrated diagrammatically in the form of a flow diagram in FIGURE 46, a pump P driven by a suitable motor M supplies fluid pressure from a suitable tank or reservoir R to two branches of the system, one of which goes directly to the filter F while the other one goes to the unloading valve 506. From the filter F through a suitable one-way check valve 507 the hydraulic pressure is directed through the manifold 504 to the electrically operated flow control valve 508 as well as to the pressure reducing valve 510. As mentioned earlier, the flow control valve 508 is a solenoid operated three-way valve which is energized during the time the machine is running in a manner described hereinafter. When the solenoid of valve 508 is energized, the latter through tube 528 connects the system pressure line to a suitable conventional accumulator D, which is employed to absorb shock and to store energy or pressure in the hydraulic system. From the pressure reducing valve 510, fluid pressure is forwarded to the three hydraulic actuators which oscillate the vertical column B, raise and lower the carriage C and reciprocate the arm A, respectively. In FIGURE 46 these actuators are designated as column swing actuator, vertical carriage actuator, and horizontal arm actuator, respectively. The pressure line between the check valve 507 and pressure reducing valve 510 is connected through manifold block 504 to the two three-way solenoid actuated valves 512 which through tubes 384 and 404 mentioned earlier, are connected to the hydraulic gripper mechanism actuator housing 380.

The return flow from all hydraulic actuators is directed through manifold block 504 to return tube 520 connected to reservoir R. In case the hydraulic fluid reaches an abnormal temperature thermostat valve 514 in manifold block 504 is actuated and automatically directs return fluid through tube 518 into a suitable radiator E which cools it, then discharges it into the reservoir. The unloading valve 506 and the solenoid flow control valve 508 through the manifold block 504 are connected to the return duct 520. High pressure safety valve 516 in manifold block 504 prevents excessive hydraulic pressure in the system before reaching the pressure reducing valve 510. It is employed to discharge such surplus pressure into the return duct as illustrated in FIGURE 46.

*Programming mechanism*

The machine described hereinabove is designed to operate automatically and perform a series of repetitive operations and functions in accordance with a programmed sequence. In order to effect this controlled operation of the machine, there is provided mechanism whereby the several actuated parts can be manually controlled so that they move through the desired pattern necessary to effect the final programmed series of repetitive operations and functions. As the series of controlled movements of the several actuated parts of the machine is taking place, these movements are recorded, as on a tape, which can be used in the control apparatus of the machine for effecting the automatic repetitive duplication of the recorded movements.

A mechanism suitable for effecting the recording of movements in a programmed sequence is illustrated in FIGURES 42–45. In order to guide the machine through the desired operation to be programmed, the machine is provided with a detachable programming arm H which may be mounted during programming operation on a ring shaped bearing member 610 which is integral with the column cap plate 146.

Programming arm H (FIGS. 1, 42, 43 and 44) consist of an arm member 612 to one end of which is secured by screws 614, a hub 616 to the outer periphery of which is rotatably locked a suitably shaped stepped bushing 618 (FIG. 42), designed for insertion into the bearing member 610 mentioned above. A suitable thumb screw 620 is provided to lock bushing 618 securely to bearing member 610 so that arm member 612 may be rotated about hub 616 fulcrumed in bushing 618. The pivot point of arm H, incidentally, lies in the same vertical axis as the pivot point of the vertical column B.

Secured to the free end of arm member 612 is a vertical sleeve 622 (FIG. 42) which rotatably supports a hollow programming head 624 provided with a bottom plate 626 and a cover 628. Within the stepped down top portion of head 624 is securely seated in a ring member 630 from the inner face of which project two opposedly mounted gimbal ball studs 632 which engage with and serve as support for a gimbal ring 634. Within gimbal ring 634 (FIG. 43) is suspended ball studs 636, another gimbal ring 638 with the studs located opposite each other and 90° apart from studs 632. Secured to the center portion of gimbal ring 638 is a suitable vertical linear bearing 640 (FIG. 42) which slidingly suports a vertical sleeve 642 to the top end of which is secured a handle or programming stick 644.

Sleeve 642 and stick 644 are yieldingly held by means of a pair of spaced springs 646 surrounding the sleeve. The upper spring is confined between the top face of vertical bearing 640 and a cup shaped member 648 while the lower spring is confined between the bottom face of bearing 640 and a cup shaped member 650 as illustrated in FIGURE 42. Cup shaped members 648 and 650 which serve as spring retainers, are suitably secured to vertical sleeve 642. Mounted on the lower end of sleeve 642 is a suitably shaped lug 652 which carries a pair of spaced pins 654 projecting horizontally therefrom. Pins 654 extend through a vertical elongated slot 658 in bracket 660 suspended from and secured to the lower side of the gimbal ring 638. Also vertically secured to bracket 660 is a suitable linear potentiometer 662 provided with a wiper 664 having an actuating arm 666, the face end of which is clamped in ball joint fashion between a forked spring plate 668 and a flat spring plate 670, as illustrated in FIGURE 44. Spring plates 668 and 670 at one end are mounted on a horizontal lug 672 which is integral with and projects from bracket 660. The other end of spring plate 670 extends through the space between the two horizontal pins 654 projecting from leg 652 mounted on sleeve 642 so that an up and down movement of the programming stick 644 by the operator causes an up and down movement of arm 666 and wiper 664 of linear potentiometer 662.

Mounted on the top face of the inner gimbal ring 638 and concentric with the vertical bearing 640 is a cross-shaped double layer flat leaf spring member 668. This member is securely held between a bottom plate 671 and a top plate 672 both locked to the vertical bearing 640 and the top surface of gimbal ring 638. The cross-shaped leaf spring member has two opposed long arms 674 and two opposed short arms 676. The free ends of the two pairs of leaf spring arms project through suitable cut-outs 678 and rest on suitable projections 680 extending into each cut-out 678 (FIG. 43). The bottom side of each long arm 674 of the spring leaf member 668 in normal position just touches the top end of a screw 682 (FIG. 44) and the bottom side of each short arm 676 of said spring member touches the top end of a screw 684 (FIG. 42). Screws 682 are mounted 180° apart and project upwardly from ring member 630. Screws 684 are also mounted 180° apart from each other and project upwardly from gimbal ring 634. Screws 682 and 684 are speced 90° apart from each other. This arrangement assures that regardless of which direction programming stick 644 is tilted by the operator, it will, upon release come back to its normal or neutral upright position.

A linear potentiometer 688 is suspended from bracket 686 mounted on the bottom side of ring member 630. Potentiometer 688 is provided with the same type of wiper 664 and arm 666 as the potentiometer 662, mentioned heretofore. Potentiometer 688 is mounted at a suitable angle and free ball shaped end of its arm 666 is held in movable contact in an indentation of the lower side of the gimbal ring 634 by means of a suitable clip 690 (FIG. 42) also fastened to the lower side of gimbal ring 634. The ball joint connection of the free end of potentiometer arm 666 with gimbal ring 634 is located a suitable distance from the horizontal center line of the two opposed ball studs 632 which represent the pivot point of the gimbal ring 634. If the operator tilts the stick 644 toward or away from himself it causes gimbal ring 634 to swing in the same direction as the stick is moved and thus effect an up or down movement of wiper 664 along the coil angularly mounted potentiometer 688.

Another angularly mounted linear potentiometer 694 (FIG. 44) is attached to a bracket 692 suspended from gimbal ring 634. Like potentiometer 662 and 688 is provided with a wiper 644 and an arm 660, the ball shaped free end of which movably engages with a suitable indentation in the bottom side of gimbal ring 638 and is held in engagement therewith by forked clip 696 secured to the bottom side of gimbal ring 638, as illustrated in FIGURE 45. The ball joint connection of the free end of the potentiometer arm with the bottom of gimbal ring 638 is located a suitable distance from the horizontal center line of the ball studs 636 which act as the pivot points of the gimbal ring 638. If the operator tilts the stick either to the right or left side the gimbal ring 638 swings in the same respective direction and thus effects an up or down movement of wiper 664 over the coil of potentiometer 694. The top portion of the programming stick 644 carries a push button switch 698 which is employed for the purpose of actuating the flow control valve 558 during programming operation.

As mentioned heretofore, the programming head 624 is rotatably supported in the sleeve 622 carried by the arm 612. In order to keep the programming head 624 and the control mechanism carried by the same in the same relative position to the machine as well as the operator regardless of the position of the arm 612, the head 624 by means of a suitable endless belt 700 is connected to the bushing 618 which is locked to the stationary bearing member 610. The endless belt 700 engaging with a groove in the stationary bushing 618 and with a groove in the rotatably mounted programming head 624 acts as a parallelogram and assures that head 624 always remains in the same realtive position regardless of how the operator swings the arm 612 about its pivotal hub 616.

*Resolvers*

In order to track the swing movement of the column B, the vertical movement of the carriage C and the horizontal movement of the arm A and also to emit suitable signals indicating the specific positions of these units during the cycle of the machine, each unit is provided with a conventional resolver, such as a type AY-192-A1 manufactured by the Bendix Aviation Corporation. These resolvers are in essence variable transformers, each consisting of a stator and a rotor.

As mentioned, hereinabove, the column swing actuator unit, as shown in FIGURES 4 and 9, also transmits its oscillating motion through gear 126 to 128 on vertical shaft 130 to the upper end of which is secured another gear 702 meshing with a gear 704 mounted on rotor shaft 706 (FIGURES 4 and 9) of resolver 708 mounted on bracket 132 (FIG. 4).

In order to track the vertical movement of carriage C, carrier housing 162 carries a resolver 710 (FIGS. 1, 4 and 14) on the rotor shaft of which is mounted gear 712, meshing with a vertical gear rack 714, mounted on vertical column member 134. Thus vertical up and down movement of carriage C will effect a clock or counter-clockwise rotation of the rotor shaft of resolver 710.

The horizontal reciprocating motion of horizontal arm A is tracked by means of resolver 716 (FIG. 1) secured to carrier housing 162. Rotor shaft 718 (FIG. 13) of resolver 716 carries a gear 720 which engages with gear rack 722 (FIGS. 1, 4, 13 and 34) secured to the lower side of the tubular housing of arm A.

*Recording*

As mentioned before, programming arm H is employed for the purpose of recording a program consisting of the desired motion of the machine onto a suitable medium, such as a magnetic recording tape. The guiding of the machine through the desired motion to be recorded is accomplished by the manipulation of the programming stick 644 by the operator.

FIGURE 47 illustrates diagrammatically in block diagram, a suitable circuit which may be used to effect the programming of the position information of the swing motion of the vertical column B, the vertical motion of the carriage C and the horizontal motion of the arm A. In order to provide hydraulic pressure, the operator depresses pushbutton switch 698, located at the top end of the stick 644, and keeps it depressed during the entire programming operation.

The depression of pushbutton switch 698 effects the energization of the flow control valve 508 which causes a closing of the drain and return duct within the same and thus permits pressure to build up in the system and be retained therein as long as said valve 508 remains energized.

Linear potentiometers 688, 662 and 694 are connected to suitable amplifiers 724, 726 and 728, respectively, which in turn are connected to the torque motors of the servo valves 112, 216 and 278, respectively.

As described previously, servo valve 112 controls the actuator for the vertical column swing motion, servo valve 216 controls the actuator for the vertical carriage motion and servo valve 278 controls the actuator for the vertical column swing motion, servo valve 216 controls the actuator for the vertical carriage motion and servo valve 278 controls the actuator for the horizontal arm A motion. Depending upon the degree and direction of the movement of the stick 644 by the operator, the linear potentiometers 688, 662 and 694 pick up D.C. signals and polarities which through their respective amplifiers are transmitted to the torque motors of their respective servo valves, thus actuating the latter and effecting the desired degree and direction of motion of vertical column B, carriage C and horizontal arm A.

Since these actuator units are mechanically connected with their respective resolvers 708, 710 and 716, each rotor shaft of each resolver is rotated in relation to the movements of its respective actuator unit. Resolver power or excitation to the stator of each resolver during recording operation is provided by a suitable conventional oscillator 730 (FIG. 47) which causes the mechanically driven rotor of each resolver to provide an output signal. The output signals of each rotor of each resolver are correlated and depend on the motion and position of its respective actuator unit. The signals thus emitted by the resolvers 708, 710 and 716 are recorded on individual channels 3, 2 and 1, respectively, of a tape T of a suitable tape recorded (not shown); i.e., a magnetic tape recorder. The resolver power or excitation oscillator signal is also recorded on an individual channel 4 of tape T to provide resolver stator excitation to be used on subsequent play back in the operation of the machine.

In order to actuate the gripper swing and closing mechanism and to program and record its motions, the operator manipulates the pushbuttons 732 and 734 each of which is connected to a three-way solenoid valve 512 and signal generators 736 and 738, respectively. As mentioned earlier, one of the solenoid valves 512 controls the swing and wrist motion of the gripper fingers 324 and 326, while the other valve controls their opening and closing.

As illustrated in FIGURE 47, a depression of pushbutton 732 actuates the valve controlling the swing and wrist motion of the gripper and at the same time energizes the signal generator 736, which in turn effects the output of a corresponding signal to be recorded on channel 5 of the tape T. When the operator depresses pushbutton 734, the valve effecting the closing and opening of the gripper fingers is actuated and the signal generator 738 is energized. The latter thereby emits a corresponding output signal which is recorded on channel 6 of tape T. The signal generators 736 and 738 are suitable conventional oscillators commonly employed for this purpose. A suitable oscillator is a wide range oscillator, such as a model CD, manufactured by Hewlett-Packard Corp., Palo Alto, California.

*Play back*

In order to effect the operation of the machine in the exact manner as recorded on tape T, a suitable circuit, such as shown in block diagram in FIGURE 48, is provided to read-out the information previously recorded on the tape.

The signals or commands from the channels 1, 2 and 3 of the tape T are transmitted to suitable error detectors 740, 742 and 744, respectively, which simultaneously receive signals from the actuator unit resolvers 716, 710 and 708 respectively, and emit signals which are directed through suitable amplifiers 746, 748 and 750, respectively, to the torque motors of the respective servo valves 278, 216 and 112. As mentioned earlier, the actuation of the latter through the respective horizontal arm actuator, the vertical carriage actuator and the column swing actuator effect the desired degree and direction of movements of the respective units of the machine. The resolver power or excitation of the stator of each resolver 716, 710, and 708 is provided by the oscillator signal previously recorded on channel 4 of the tape T. The error detectors 740, 742 and 744 are phase discriminators employed for the purpose of determining the difference in the phase of the individual unit resolver relative to the signal received from the respective channel of the tape T. The output of each error detector 740, 742 and 744 is the result of the phase difference between the signal received from channel 1, 2 and 3 respectively and the signal received from the unit resolver 716, 710 and 708 respectively.

A suitable error detector circuit is shown diagrammatically in FIGURE 49. The purpose of this circuit is to produce an output voltage approximately proportional to the difference in phase between the voltage $E_R$ from the rotor of a resolver and $E_T$ the command voltage from tape T. The circuit illustrated operates as follows: Assume $E_T$ to be temporarily equal to zero. The voltage $E_R$ produces at the transformer secondary two voltages, $E'_R$ and $E''_R$ which at one instant will have the polarity indicated, and will always be 180° out of phase with each other. The diodes 802, 804 rectify these voltages and produce D.C. voltages across resistors 806 and 808 whose magnitude is approximately proportional to the peak voltages of $E'_R$ and $E''_R$ with the polarities indicated in the figure because current will only flow in direction of arrows. The resistor 810 is a summing resistor—if the circuit is symmetrical and resistor 810 is set at its center, the output voltage will be zero. Preferably, resistor 810 is adjusted to be zero to compensate for inequalities in diode efficiency or transformer turns ratio.

Suppose a voltage $E_T$ of the same frequency as $E_R$ is applied to the grid 813 of the cathode follower 812. The output of the cathode follower (which is essentially of the same voltage as its input although having greater current) appears across resistor 814 and adds to both $E'_R$ and $E''_R$. If, for example, the phase of $E_T$ is the same as $E'_R$, the peak voltage reaching diode 802 will be increased, resulting in a larger voltage across resistor 806 and—since $E_T$ is 180° out of phase with $E''_R$—the peak voltage reaching diode 804 will be less, resulting in a smaller voltage across resistor 808.

A net positive voltage will appear at the output since one end of the summing resistor 810 has become more positive, while the other end of resistor 810 has become less negative. When voltage $E_T$ is in phase with voltage $E''_R$, the opposite state of affairs will occur. When voltage $E_T$ is 90° out of phase with voltages $E'_R$ and $E''_R$, the output will remain zero.

In this way it is possible to obtain an output which varies from plus to minus indicating phase lead or lag. This circuit gives a measure of phase error between two signals and converts it to D.C. suitable for actuating the torque motors of the servo valves and effect the accurate operation of the actuators. The accuracy is achieved by the fact that there is a command signal and a position signal and the error between the two is converted into proper controlling signals so that the servo valves can effect the proper operation of the actuators in such directions as to diminish errors to sub-zero whereby the machine at all times must remain in correct position.

The actuation of the servo valves 278, 216 and 112 through the amplifiers 746, 748 and 750 effect the desired motion of the respective units and the rotor of each resolver is rotated by the motion of its respective unit.

The solenoid actuated gripper swing valve and gripper closing valve 512 which actuate the gripper swing and gripper closing mechanism respectively are controlled by and receive their power through the signal detectors 752 and 754 from the signals recorded on channels 5 and 6 respectively of the tape T.

Each signal detector, one of which is shown in FIGURE 50 of the drawings consists of a tone sensitive relay 756 which is energized from the respective signal on the tape and which in turn causes the energization of another suitable relay 758 to effect the operation of the respective three-way solenoid valve 512. As illustrated in FIGURE 50 the energization of the relay 758 causes the closing of its contacts 760 and thus providing AC power to operate the gripper valve 512. Also as illustrated in FIGURE 50, the power line K may be provided with a selector switch 762 which when moved from "play back" to "record" permits power through a suitable line N to reach and operate the gripper valve 512 when the push button 732 is manipulated by the operator during recording operation.

During recording, as mentioned heretofore, the flow control valve 508 which controls the hydraulic pressure in the system is actuated by the operator by means of pushbutton 698 (FIG. 47) in control arm H. However, since the latter is removed during "play back" and it is desirable to keep up the pressure in the system during "play back" a switch 764 is provided and manually closed to permit constant energization of said valve 508 during "play back" operation.

The recording of the several signals on tape T and the reproducing thereof in operating the machine can be effected by a suitable conventional recording-reproducing apparatus. We have found that an Ampex Model FR1100 Multi Channel Recorder-Reproducer, manufactured by Ampex Corporation, Redwood City, California, gives satisfactory results.

It will thus be seen that the objects set forth above, and those made apparent from the preceding description, are efficiently attained. As various changes may be made in the form, construction and arrangement of the parts herein without departing from the spirit and scope of the invention and without sacrificing any of its advantages, it is to be understood that all matter herein is to be interpreted as illustrative and not in a limiting sense.

We claim:

1. A machine of the type described, comprising a base, a column mounted thereon for rotary movement about a vertical axis, a horizontal arm mounted on said column for vertical movement therealong and for movement along a horizontal axis perpendicular to said vertical axis, a wrist member mounted at an end of said arm for rotary movement about said horizontal axis and for swinging about a central vertical axis perpendicular thereto, a work manipulating member mounted on said wrist member for engaging and handling a work piece, a first hydraulic actuator including means coupled to said column for reciprocally rotating said column, a second hydraulic actuator including means coupled to said arm for raising and lowering said arm, a third hydraulic actuator including means coupled to said arm for reciprocally moving said arm along said horizontal axis, a fourth hydraulic actuator including means coupled to said wrist member for rotating said wrist member, a fifth hydraulic actuator including means coupled to said wrist member for swinging said wrist member, a sixth hydraulic actuator including means coupled to said work manipulating member for operating said work manipulating member, a source of fluid under pressure, conduit means connecting said source to each of said hydraulic actuators, servo-valve means associated with each of said actuators for controlling the flow of fluid thereto and electrical control means for operating said valve means separately or in combination.

2. In a machine for performing work of the type described, apparatus for reciprocally moving a horizontal arm within a carriage vertically movable on a rotatable column, comprising a pair of hydraulic motor units mounted on said column, each of said units comprising a cylinder and fluid actuated plunger, a source of fluid under pressure connected to each of said units, means regulating the flow of fluid to and from said units to actuate said plungers for unitary reciprocal movement, and gear means connecting said plungers and said arm for translating the movement of said plungers to said arm.

3. In a machine for performing work of the type described, apparatus for reciprocally moving a horizontal arm within a carriage vertically movable on a rotatable column, comprising a pair of hydraulic motor units mounted on said column for movement therewith, each having a cylinder and fluid actuating plunger, a source of fluid under pressure, conduit means connecting said source and each of said units, servo-valve means for regulating the flow of fluid selectively to and from said units to cooperatively actuate said plungers in linear reciprocal directions, control means for operating said valves in a prescribed sequence, first gear means interconnecting said pistons for translating their linear movement to rotary motion, an elongated grooved rod secured at one end to said first gear means so as to rotate therewith and having its other end extending through said carriage, second gear means mounted on said carriage to move vertically on said rod and keyed thereto so as to rotate therewith, and a rack fixedly mounted on said arm engaging said second gear means, whereby the reciprocal linear movement of said plungers is translated to said arm.

4. In a machine for performing work of the type described, apparatus for engaging and handling a work piece, comprising a substantially hollow tubular arm having work handling means mounted at an end thereof, said work handling means being adapted to manipulate a work piece and to be rotated about the longitudinal axis of said arm and about a central axis perpendicular thereto, a plurality of movable sleeve members mounted within said arm adapted to be actuated by fluid pressure, one of said sleeve members being adapted to manipulate said work handling means, another of said sleeve members being adapted to rotate said work handling means about said longitudinal axis and a third of said sleeve members being adapted to rotate said work handling means about said perpendicular axis, means separating said sleeve members to permit distinct actuation of each, means respectively connecting each of said sleeve members to said work handling means, a source of fluid under pressure, conduit means connecting said source to said arm in position to actuate said sleeve members, servo-valve means regulating the flow of said fluid to operate each of said sleeve members and control means for automatically operating said servo-valve means in a prescribed sequence.

5. Apparatus according to claim 4 including means for limiting the movement of said sleeve members and said work handling means.

6. Apparatus according to claim 4 including spring means normally biasing said sleeve members from actuating said work handling means.

7. Apparatus according to claim 4 wherein said work handling means comprises a gripper having a pair of fingers adapted to engage and hold a work piece.

8. A machine of the type described, comprising a base, a column mounted thereon for rotary movement about a vertical axis, a horizontal arm mounted on said column for vertical movement along said axis, and for movement along a horizontal axis perpendicular to said column, a wrist member mounted at an end of said arm for rotary movement about said horizontal axis and for swinging movement about a central vertical axis perpendicular to said horizontal axis, a work manipulating member mounted on said wrist member for engaging and handling a work piece, a first hydraulic actuator including means coupled to said column for oscillating said column, a second hydraulic actuator including means coupled to said arm for raising and lowering said arm, a third hydraulic actuator including means coupled to said arm for reciprocally moving said arm along said horizontal axis, a fourth hydraulic actuator including means coupled to said wrist member for oscillating said wrist member, a fifth hydraulic actuator including means coupled to said wrist member for swinging said wrist member, a sixth hydraulic actuator including means coupled to said work manipulating member for operating said work manipulating member, a source of fluid under pressure, conduit means connecting said source to each of said hydraulic actuators, servo-valve means associated with each of said actuators for controlling the flow of fluid thereto, a programming arm mounted on said machine for manually directing the movement of said column, said arm, said wrist member and the operation of said work manipulating through a prescribed path of travel and operation, means producing an electrical signal responsive to the movement of said programming arm respective to each of said servo-valves for controlling each of said actuators to operate said machine through said prescribed path of travel and operation, means for sensing the movement and operation of each of said actuators and for indicating the same as series of electrical signals respectively associated with each of said actuators, means for recording said second mentioned series of signals, means for repetitively playing back said second series of signals and feeding the same to said servo-valves to automatically operate said machine.

9. A machine of the type described, comprising a base, a column mounted thereon for reciprocal rotary movement about a vertical axis, a horizontal arm mounted on said column for vertical movement along said axis, and for movement along a horizontal axis perpendicular to said vertical axis, a wrist member mounted at an end of said arm for reciprocal rotary movement about said horizontal axis and for reciprocal swinging movement about a central vertical axis perpendicular thereto, a work manipulating member mounted on said wrist member for engaging and handling a work piece, a first hydraulic actuator including means coupled to said column for oscillating said column, a second hydraulic actuator including means coupled to said arm for raising and lowering said arm, a third hydraulic actuator including means coupled to said arm for reciprocally moving said arm along said horizontal axis, a fourth hydraulic actuator including means coupled to said wrist member for oscillating said wrist member, a fifth hydraulic actuator including means coupled to said wrist member for swinging said wrist member, a sixth hydraulic actuator including means coupled to said work manipulating member for operating said work manipulating member, a source of fluid under pressure, conduit means connecting said source to each of said hydraulic actuators, electrically controlled servo-valve means located within each conduit controlling the flow of fluid to said hydraulic actuators, a programming arm mounted on said machine for manually directing the movement of said column, said arm, said wrist member and the operation of said work manipulating member through a prescribed path of travel and operation, means producing an electrical signal responsive to the movement of said programming arm respective to each of said servo-valves for controlling each of said actuators to operate said machine through said prescribed path of travel and operation, means continuously sensing the movement and operation of each of said actuators with respect to fixed initial positions, and for indicating the same as series of electrical signals, means for recording said second series of signals, means for repetitively playing back said second series of signals and feeding the same to said servo-valves to automatically operate said machine.

10. The machine according to claim 9 wherein said sensing means includes a variable transformer resolver associated with each of said column and arm actuators and including means connecting the associated resolvers with its respective actuator respectively.

11. The machine according to claim 9 wherein said sensing means includes a signal generator associated with each of the actuators for said wrist and work manipulating members, said generators producing a signal indicative of the movement and operation of said members.

12. A work handling device comprising an arm, a housing located at one end of said arm, a pair of gripping fingers extending from said housing and adapted to hold a work piece, said fingers being respectively mounted on a pair of engaging pinions, one of said pinions being located substantially centrally of said housing, said pinions being cooperatively rotatable in opposite directions and conjointly movable about a vertical axis passing through said centrally located pinion, means for rotating one of said pinions to angularly move said fingers toward and away from each other and for conjointly moving said pinions to angularly swing said fingers about said vertical axis.

13. The device according to claim 12 wherein said means for rotating and moving said pinions comprise at least a pair of linearly movable racks located in said arm and extending into said housing in engagement with said pinions, said racks being selectively movable separately or in combination.

14. The device according to claim 12 including means for limiting the conjoint movement of said fingers comprising a substantially U shaped channel structure formed in the lower portion of said housing and mounted for rotatable movement in conjunction with said centrally located pinion, a plurality of rollers located in said channel, adjustable means for limiting the length of said channel, and abutment means located in said channel for engaging said rollers and stopping the rotation of said channel structure.

References Cited by the Examiner

UNITED STATES PATENTS

| | | | |
|---|---|---|---|
| 218,209 | 8/79 | Agnew | 187—17 |
| 725,312 | 4/03 | Anderson | 212—57 |
| 1,077,090 | 10/13 | McGowan | 251—58 |
| 2,269,786 | 1/42 | Rose | 187—17 |
| 2,439,368 | 4/48 | Munschauer | 92—136 X |
| 2,475,245 | 7/49 | Leaver | 320—172.51 |
| 2,537,770 | 1/51 | Livingston | 340—172.51 |
| 2,679,940 | 6/54 | Goertz. | |
| 2,722,102 | 11/55 | Pilch | 214—138 X |
| 2,745,429 | 5/56 | Crookston | 137—492.5 |
| 2,781,053 | 2/57 | Berninger | 137—492.5 |
| 2,781,136 | 2/57 | Sehn. | |
| 2,898,577 | 8/59 | Eachus | 340—172.51 |
| 2,905,929 | 9/59 | Marklew | 340—172.51 |
| 2,910,321 | 10/59 | Sehn. | |
| 2,959,301 | 11/60 | Willsea. | |
| 2,980,265 | 4/61 | Johnson. | |
| 3,007,097 | 10/61 | Shelley. | |

HUGO O. SCHULZ, *Primary Examiner.*

ERNEST A. FALLER, *Examiner.*